US009674502B2

(12) United States Patent
Park et al.

(10) Patent No.: US 9,674,502 B2
(45) Date of Patent: Jun. 6, 2017

(54) METHOD FOR PROVIDING FRAGMENT-BASED MULTIMEDIA STREAMING SERVICE AND DEVICE FOR SAME, AND METHOD FOR RECEIVING FRAGMENT-BASED MULTIMEDIA STREAMING SERVICE AND DEVICE FOR SAME

(75) Inventors: Tae-sung Park, Yongin-si (KR); Hee-jean Kim, Yongin-si (KR); Gil-yoon Kim, Suwon-si (KR); Nam-guk Kim, Seoul (KR); Do-young Joung, Seoul (KR); Ga-hyun Ryu, Suwon-si (KR); Kyu-heon Kim, Seoul (KR); Jung-han Kim, Bucheon-si (KR); Jang-won Lee, Suwon-si (KR); Gwang-Hoon Park, Seongnam-si (KR); Doug-Young Suh, Seongnam-si (KR)

(73) Assignees: SAMSUNG ELECTRONICS CO., LTD., Suwon-si (KR); Industry Academic Cooperation Foundation Kyunghee University, Yongin-si (KR)

( * ) Notice: Subject to any disclaimer, the term of this patent is extended or adjusted under 35 U.S.C. 154(b) by 491 days.

(21) Appl. No.: 13/703,286

(22) PCT Filed: Jun. 9, 2011

(86) PCT No.: PCT/KR2011/004230
§ 371 (c)(1),
(2), (4) Date: Mar. 1, 2013

(87) PCT Pub. No.: WO2011/155776
PCT Pub. Date: Dec. 15, 2011

(65) Prior Publication Data
US 2013/0147914 A1  Jun. 13, 2013

Related U.S. Application Data

(60) Provisional application No. 61/366,279, filed on Jul. 21, 2010, provisional application No. 61/352,895, filed on Jun. 9, 2010.

(51) Int. Cl.
*H04N 15/00* (2006.01)
*H04N 13/00* (2006.01)
(Continued)

(52) U.S. Cl.
CPC ..... *H04N 13/0048* (2013.01); *H04N 13/0059* (2013.01); *H04N 13/0066* (2013.01);
(Continued)

(58) Field of Classification Search
None
See application file for complete search history.

(56) References Cited

U.S. PATENT DOCUMENTS 8,111,283 B2   2/2012  Kim et al.
2003/0095177 A1  5/2003  Yun et al.
(Continued)

FOREIGN PATENT DOCUMENTS

CN   1893653 A    1/2007
CN   101711483 A  5/2010
(Continued)

OTHER PUBLICATIONS

S. Pehlivan et al: "End-To-End Stereoscopic Video Streaming System", 2006 IEEE 14th Signal Processing and Communications Applications, Jan. 1, 2006 (Jan. 1, 2006), pp. 1-4, XP055102638, DOI: 10.1109/SIU.2006.1659908.*
(Continued)

*Primary Examiner* — James M Anderson, II
(74) *Attorney, Agent, or Firm* — Sughrue Mion, PLLC

(57) ABSTRACT

Provided are method and apparatus for transmitting and receiving a multimedia streaming service via a network. The method of providing a multimedia streaming service includes: dividing encoded data of a video including at least one of a two-dimensional (2D) video and a three-dimensional (3D) video into fragments; determining at least one of
(Continued)

3D signaling information for each fragment and relationship information to be used when the video refers to other videos; and continuously transmitting the fragments including the property information regarding the fragments and encoded video data.

20 Claims, 17 Drawing Sheets

(51) Int. Cl.
*H04N 21/236* (2011.01)
*H04N 21/845* (2011.01)
*H04N 21/434* (2011.01)
*H04N 21/81* (2011.01)
*H04N 21/854* (2011.01)

(52) U.S. Cl.
CPC ... *H04N 21/23614* (2013.01); *H04N 21/4348* (2013.01); *H04N 21/816* (2013.01); *H04N 21/8456* (2013.01); *H04N 21/85406* (2013.01)

(56) References Cited

U.S. PATENT DOCUMENTS

| | | | |
|---|---|---|---|
| 2005/0185712 A1* | 8/2005 | Lee | 375/240.1 |
| 2006/0150053 A1 | 7/2006 | van der Schaar et al. | |
| 2008/0205860 A1 | 8/2008 | Holtman | |
| 2009/0195640 A1 | 8/2009 | Kim et al. | |
| 2010/0161686 A1 | 6/2010 | Yun et al. | |
| 2010/0171812 A1 | 7/2010 | Kim et al. | |
| 2011/0254920 A1 | 10/2011 | Yun et al. | |
| 2011/0273541 A1 | 11/2011 | Kitazato | |

FOREIGN PATENT DOCUMENTS

| | | |
|---|---|---|
| EP | 1 751 979 | 12/2005 |
| EP | 1713285 A1 | 10/2006 |
| EP | 1 739 979 A2 | 1/2007 |
| JP | 2004228743 A | 8/2004 |
| JP | 201182666 A | 4/2011 |
| KR | 10-2007-0117598 A | 12/2007 |
| WO | 2004/056118 A1 | 7/2004 |
| WO | WO 2004056118 A1 * | 7/2004 |
| WO | 2004/075555 A1 | 9/2004 |
| WO | 2005/114998 A1 | 12/2005 |
| WO | 2008/054100 A1 | 5/2008 |
| WO | 2008156318 A2 | 12/2008 |
| WO | 2010/053246 A2 | 5/2010 |

OTHER PUBLICATIONS

International Search Report (PCT/ISA/210), dated Jan. 19, 2012, issued by the International Searching Authority in corresponding International Application No. PCT/KR2011/004230.
Written Opinion (PCT/ISA/237), dated Jan. 19, 2012, issued by the International Searching Authority in corresponding International Application No. PCT/KR2011/004230.
International Standard, ISO/IEC 14496-12, "Information technology—Coding of audio-visual objects—Part 12: ISO base media file format," Second edition, Apr. 1, 2005, 93 pages.
International Standard, ISO/IEC 23000-11, "Information technology—Multimedia application format (MPEG-A)—Part 11: Stereoschopic video application format," First edition, Nov. 15, 2009, 30 pages.
Communication dated Mar. 3, 2014 issued by the European Patent Office in counterpart European Application No. 11792687.3.
Selen Pehlivan, "End-to End Stereoscopic Video Streaming System", IEEE 14th Signal Processing and Communications Applications, Jan. 1, 2006, 96 pgs. total, XP055102638.
Pehlivan et al.; "End-to-End Stereoscopic Video Streaming System"; IEEE International Conference on Multimedia and Expo; 2006; Istanbul, Turkey; pp. 2169-2172.
Kim et al.; "Efficient stereoscopic contents file format on the basis of ISO base media file format"; Multimedia on Mobile Devices; 2009; vol. 7256; SPIE-IS&T; Yongin, Republic of Korea.
Communication dated Sep. 12, 2014 issued by the Intellectual Property Office of the People's Republic of China in counterpart Chinese Patent Application No. 201180039011.5.
Communication dated Aug. 18, 2015, issued by the Japanese Patent Office in counterpart Japanese Application No. 2013-514117.
Communication issued Jul. 5, 2016, issued by the Japanese Patent Office in counterpart Japanese Patent Application No. 2013-514117.

* cited by examiner

FIG. 4

```
aligned(8) class MovieFragmentStereoscopicInformationBox extends
FullBox('mfsi', version=0, mfsi_flag){
        // stereoscopic visual type information
        unsigned int(8) stereoscopic_composition_type;
        unsigned int(7) reserved = 0;
        unsigned int(1) is_left_first;
        unsigned int(32) stereo_mono_change_count;
        for (int i=0; i<stereo_mono_change_count; i++)
        {
                unsigned int(1) stereo_flag;
                unsigned int(31) sample_count;
                if (stereo_flag == 1)
                {
                        unsigned int(8) stereoscopic_composition_type;
                        unsigned int(7) reserved = 0;
                        unsigned int(1) is_left_first;
                        unsigned int(32) scdi_item_count;
                        for (int j=0; j<scdi_item_count; j++)
                        {
                                unsigned int(32) scdi_ID
                                unsigned int(32) scdi_duration;
                        }
                }
        }
}
```

FIG. 6

```
aligned(8) class StereoscopicVideoFragmentInformationBox
extends FullBox('svfi', version = 0, 0){
  unsigned int(32)    stereo_mono_change_count;
  for(i=1; i<=stereo_mono_change_count; i++){
    unsigned int(32)    sample_count;
    unsigned int(7)     reserved = 0;
    unsigned int(1)     stereo_flag;
  }
}
```

FIG. 7

```
aligned(8) class StereoscopicVideoFragmentInformationBox
extends FullBox('svfi', version = 0, 0){
  unsigned int(32)    stereo_mono_change_count;
  for(i=1; i<=stereo_mono_change_count; i++){
    unsigned int(32)    sample_count;
    unsigned int(7)     reserved = 0;
    unsigned int(1)     stereo_flag;
    If(stereo_flag)
        unsigned int(16) stereo_section_ID;
  }
}
```

FIG. 8

```
aligned(8) class StereoscopicVideoMediaInformationBox extends
FullBox('svmi', version = 0, 0){
        unsigned int(8)  stereoscopic_composition_type;
        unsigned int(7)  reserved = 0;
        unsigned int(1)  is_left_first;
}
```

FIG. 9

```
bit(5)    reserved=0;
bit(1)    stereo_flag;
unsigned int(2)   sample_depends_on;
unsigned int(2)   sample_is_depended_on;
unsigned int(2)   sample_has_redundancy;
bit(3)  sample_padding_value;
bit(1)  sample_is_difference_sample;
unsigned int(16)       sample_degradation_priority;
```

FIG. 11

```
1110 {  aligned(8) class TrackReferenceBox extends Box('tref') {
        }

1120 {  aligned(8) class TrackReferenceTypeBox (unsigned int(32) reference_type)
            extends Box(reference_type) {
                unsigned int(32)          track_IDs[];
        }

1130 {  aligned(8) class TrackReferenceTypeUrlBox (unsigned int(32) reference_type)
            extends Box(reference_type) {
                unsigned int(32)          entry_count;
                for(i=1; i<= entry_count; i++){
                    string location;
                }
        }
```

FIG. 14

```
aligned(8) class TrackFragmentHeaderBox
    extends FullBox('tfhd', 0, tf_flags){
        unsigned int(32)    track_ID;
        // all the following are optional fields
        unsigned int(64)    base_data_offset;
        unsigned int(32)    sample_description_index;
        unsigned int(16)    data_reference_index;
        unsigned int(32)    default_sample_duration;
        unsigned int(32)    default_sample_size;
        unsigned int(32)    default_sample_flags
    }
```

FIG. 15

1510
```
aligned(8) class DataEntryUrlBox (bit(24) flags)
    extends FullBox('url', version = 0, flags) {
    string location;
}
```

1520
```
aligned(8) class DataEntryUrnBox (bit(24) flags)
    extends FullBox('urn', version = 0, flags) {
    string name;
    string location;
}
```

1530
```
aligned(8) class DataReferenceBox
    extends FullBox('dref', version = 0, 0) {
    unsigned int(32)    entry_count;
    for (i=1; i <= entry_count; i++) {
        DataEntryBox(entry_version, entry_flags) data_entry;
    }
}
```

FIG. 16

```
1610 {  <video src="test_1644_L.mp4" systemBitrate="1644000">
            <param name="trackID" value="1" valuetype="data" stereotype="left"/>
        </video>
1620 {  <video src="test_1644_R.mp4" systemBitrate="1644000">
            <param name="trackID" value="1" valuetype="data" stereotype="right"/>
        </video>
```

FIG. 19

```
<video src="test_1644.mp4' systemBitrate="1644000">
        <param name="trackID" value="1" valuetype="data" stereotype="left"/>
        <param name="trackID" value="2" valuetype="data" stereotype="right"/>
</video>
```

FIG. 20

```
<video src="test_1644.mp4"    systemBitrate="1644000">
        <param name="trackID"  value="1"  valuetype="data" />
</video>
```

FIG. 21

```
aligned(8) class AlternateFileGroupBox extends Box('afgp') {
        unsigned int(32)    entry_count;
        for(i=1; i<= entry_count; i++){
                string  file_location;
        }
}
```

```
2210 { <video src="test_1644.mp4"    systemBitrate="1644000">
          <param name="trackID"  value="1" valuetype="data" />
          <param name="alternate_group" value="1" valuetype="data" />
       </video>
2220 { <video src="test_3288.mp4"    systemBitrate="3288000">
          <param name="alternate_group" value="1" valuetype="data" />
```

METHOD FOR PROVIDING FRAGMENT-BASED MULTIMEDIA STREAMING SERVICE AND DEVICE FOR SAME, AND METHOD FOR RECEIVING FRAGMENT-BASED MULTIMEDIA STREAMING SERVICE AND DEVICE FOR SAME

CROSS-REFERENCE TO RELATED APPLICATIONS

This application is a National Stage application under 35 U.S.C. §371 of International Application No. PCT/KR2011/004230, filed on Jun. 9, 2011, and claims the benefit of U.S. Provisional Application No. 61/352,895, filed on Jun. 9, 2010 in the United States Patent and Trademark Office, the disclosures of which are incorporated herein by reference in their entireties.

BACKGROUND

1. Field

Apparatuses and methods consistent with exemplary embodiments relate to generating and receiving a data stream for transmitting multimedia contents.

2. Description of the Related Art

In general, a piece of multimedia content includes groups of elements having different properties, such as an audio, a video, an image, and metadata. These data are encoded and listed in a data structure for multimedia contents with information about relationships between the elements and information used to decide the respective elements and reproduce the same.

Regarding the data structure of multimedia contents, the Moving Picture Experts Group (MPEG), of the International Standard Organization (ISO), has defined a basic file format that is applicable to various applications, that is, an ISO base media file format. By using the ISO base media file format, auxiliary data such as encoded elements of multimedia contents and composition information related to the elements are hierarchically stored in a plurality of containers. In principle, the ISO based media file format defines a basic structure for efficiently storing respective multimedia elements in a single multimedia file.

SUMMARY

One or more exemplary embodiments provide a multimedia streaming service for transmitting a two-dimensional (2D) or three-dimensional (3D) video, and a method and apparatus for receiving the multimedia streaming service.

According to an aspect of an exemplary embodiment, there is provided a method of providing a multimedia streaming service via a network, the method including: dividing, into fragments encoded data of a video including at least one of a two-dimensional (2D) video and a three-dimensional (3D) video; determining, for each of the fragments, property information including at least one of 3D signaling information including information for 2D or 3D presentation of a current video and relationship information that is to be used by the current video to refer to at least one another video; and continuously transmitting the fragments that are each formed of an auxiliary data area including the property information of the fragments and a media data area including the encoded video data.

According to an aspect of another exemplary embodiment, there is provided a method of receiving a streaming service for receiving multimedia via a network, the method comprising: continuously receiving a plurality of fragments; extracting from a media data area of each of the fragments, encoded data of a video including at least one of a 2D video and a 3D video in a form divided into fragments; parsing property information from an auxiliary data area of each of the fragments and extracting and reading at least one of 3D signaling information for 2D or 3D presentation of a video of the fragments and relationship information that is to be used when the video refers to at least one another video; and restoring the encoded data of the fragments to a 2D video or a 3D video based on the information read from the property information for each of the fragments.

According to an aspect of another exemplary embodiment, there is provided an apparatus for providing a multimedia streaming service via a network, comprising: a fragment video data generating unit dividing encoded data of a video including at least one of a 2D video and a 3D video, into fragments; a fragment property information determining unit determining property information including at least one of 3D composition information including information for 2D or 3D presentation of a current video for each fragment and relationship information for the current video to refer to at least one another video; and a streaming unit continuously transmitting the fragments which are each formed of an auxiliary data area including the property information of the fragments and a media data area including the encoded video data.

According to an aspect of another exemplary embodiment, there is provided an apparatus for receiving a streaming service for receiving multimedia via a network, comprising: a receiving unit continuously receiving a plurality of fragments; a fragment video data extracting unit extracting from a media data area of each of the fragments, encoded data of a video including at least one of a 2D video and a 3D video, in a form divided into fragments; a fragment property information extracting unit parsing property information from an auxiliary data area of each of the fragments, and extracting and reading at least one of 3D signaling information for 2D or 3D presentation of the video of the fragments and relationship information that is to be used when the video refers to at least one another video; and a restoring unit restoring the encoded data of the fragments to a 2D video or a 3D video based on the information read from the property information of each of the fragments.

According to an aspect of another exemplary embodiment, there is provided a computer readable recording medium having embodied thereon a computer processor for executing the method of providing a multimedia streaming service. According to an aspect of another exemplary embodiment, there is provided a computer readable recording medium having embodied thereon a computer processor for executing the method of receiving a multimedia streaming service.

BRIEF DESCRIPTION OF THE DRAWINGS

The above and other features and advantages will become more apparent by describing in detail exemplary embodiments with reference to the attached drawings in which:

FIG. 4 illustrates a syntax of three-dimensional (3D) signaling information included in an mfsi box and an scdi box according to an exemplary embodiment;

FIGS. 6 and 7 illustrate a syntax of 3D signaling information included in an svfi box according to an exemplary embodiment;

FIG. 8 illustrates a syntax of 3D signaling information that is set with respect to a file in a streaming file format transmitted for each fragment according to an exemplary embodiment;

FIG. 9 illustrates a syntax of 3D signaling information that is set with respect to a sample in a streaming file format transmitted for each fragment according to an exemplary embodiment;

FIG. 11 illustrates reference information that is set with respect to a stereoscopic video included in a file according to an exemplary embodiment;

FIG. 14 illustrates a syntax of a track information including relationship information about a plurality of reference videos when transmitting a stereoscopic video to two streaming files according to an exemplary embodiment;

FIG. 15 illustrates a syntax of relationship information that is set in a file when transmitting a stereoscopic video to two streaming files according to an exemplary embodiment;

FIG. 16 illustrates relationship information that is set using an index file outside a file when transmitting a stereoscopic video to two streaming files according to an exemplary embodiment;

FIGS. 19 and 20 illustrates a method of determining a reference video by using an index file outside a file when transmitting a stereoscopic video to a streaming file according to an exemplary embodiment;

FIG. 21 illustrates a syntax of an afgp box including relationship information of a multi-channel video group according to an exemplary embodiment, for an adaptive streaming service;

DETAILED DESCRIPTION OF EXEMPLARY EMBODIMENTS

Figure 1:
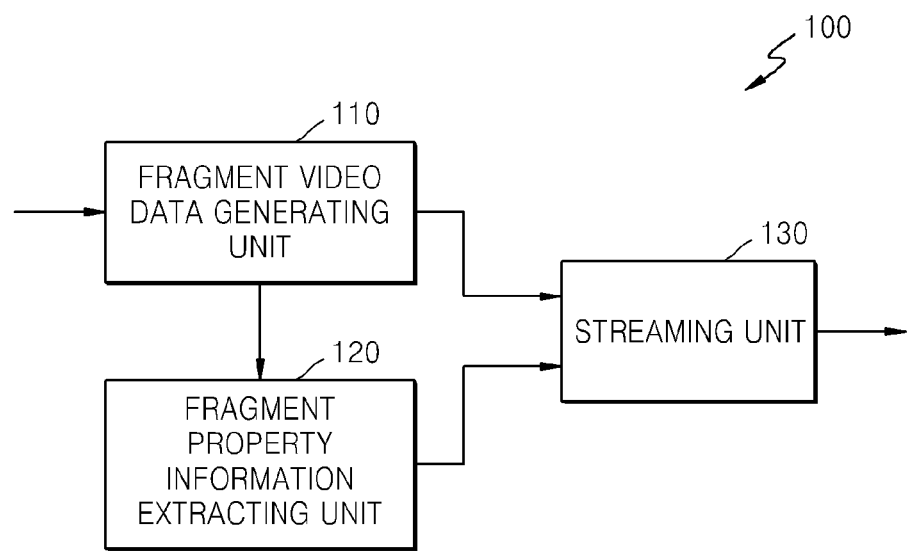
FIG. 1 is a block diagram illustrating an apparatus for providing a multimedia streaming service according to an exemplary embodiment.

Reference will now be made in detail to exemplary embodiments, examples of which are illustrated in the accompanying drawings, wherein like reference numerals refer to the like elements throughout. Exemplary embodiments are described below with reference to the drawings. Hereinafter, expressions such as "at least one of," when preceding a list of elements, modify the entire list of elements and do not modify the individual elements of the list.

FIG. 1 is a block diagram illustrating a multimedia streaming service providing apparatus 100 according to an exemplary embodiment.

The multimedia streaming service providing apparatus 100 for providing a multimedia streaming service may transmit video data of a two-dimensional (2D) video or a three-dimensional (3D) video or video data of a mixed video of a 2D video and a 3D video through a network by using a streaming file format that is sent in units of fragments, and may transmit property information including at least one of 3D signaling information regarding corresponding video data for files, fragments, or samples, and relationship information about reference relationships between a plurality of videos.

The multimedia streaming service providing apparatus 100 for providing a multimedia streaming service according to the present exemplary embodiment includes a fragment video data generating unit 110 (e.g., video data generator), a fragment property information determining unit 120 (e.g., fragment property information determiner), and a streaming unit 130 (e.g., streamer).

The fragment video data generating unit 110, the fragment property information determining unit 120, and the streaming unit 130 may closely cooperate with one another by exchanging data with one another according to a control of a central processing unit (CPU) or a processor included inside or outside the multimedia streaming service providing apparatus 100 for providing a multimedia streaming service. Alternatively, at least one of the fragment video data generating unit 110, the fragment property information determining unit 120, and the streaming unit 130 according to the present exemplary embodiment operates by using a processor mounted in itself, and may be controlled to closely cooperate with other components.

The fragment video data generating unit 110 divides video data including at least one of 2D video data and 3D video data into fragment video data in order to transmit the video data in units of fragments.

A fragment denotes a packet unit for streaming data via a network. A fragment includes a media data area for transmitting media data and an auxiliary data area for transmitting property information such as data about media data contents of the media data area and composition-related data. Streaming data may be transmitted as at least one fragment sequentially transmitted.

For example, in the case of a streaming file according to ISO base media file format, a fragment includes a mdat area including media data and a moof area including various property information about media data of the mdat area.

The multimedia streaming service providing apparatus 100 for providing a multimedia streaming service may receive video data that is encoded by compression and may divide the video data into fragments for streaming. Alternatively, the multimedia streaming service providing apparatus 100 may receive uncompressed video data and encode the video data by using an encoder mounted in the multimedia streaming service providing apparatus 100, and then divide the same into fragments.

The fragment property information determining unit 120 determines 3D signaling information including data for at least one of 2D presentation and 3D presentation of a video for each fragment.

The fragment property information determining unit 120 may determine 3D signaling information that is to be transmitted via an auxiliary data area of a fragment. The 3D signaling information includes various data that is set according to whether a current video is a 2D video or a 3D video. Also, the 3D signaling information may include various data that is used for 2D presentation or 3D presentation after a decoder restores a video.

When 3D signaling information is transmitted for each fragment, 2D video/3D video relevant information about a current video may be transmitted for each fragment.

The fragment property information determining unit 120 according to the present exemplary embodiment determines relationship information to be referred between a plurality of videos including a current video. As the relationship information, reference information and location information about other videos located in the current file may be transmitted. Also, as the relationship information, location information and index information used to refer to at least one video located in an external file of the current file may be transmitted.

The streaming unit 130 continuously transmits property information including at least one of 3D signaling information and relationship information that are determined by using the fragment property information determining unit 120 and fragments including divided video data. As the fragments are continuously transmitted, video data and 3D signaling information or relationship information may be streamed.

For each fragment, 3D signaling information and relationship information about a video of a current fragment is transmitted via an auxiliary data area, and encoded video data of the current fragment may be transmitted via a media data area.

The fragment property information determining unit 120 may determine 3D composition information and sequencing order information regarding the current video for each fragment. The 3D composition information represents a composition by which a left image and a right image form a stereoscopic image of the current video. The sequencing order information represents a sequencing order of a pair of a left image and a right image in a stereoscopic image.

The fragment property information determining unit 120 may determine stereo mono-section change count information representing the count of changes of a monoscopic video section and a stereoscopic video section regarding the current video, for each fragment.

A fragment may include a monoscopic video section formed of (i.e., including) a monoscopic image sequences or a stereoscopic video section formed of a stereoscopic image sequence. Also, a fragment may include a mixed video section including a monoscopic video section and a stereoscopic video section.

The fragment property information determining unit 120 may determine stereo information indicating whether a current section is a monoscopic video section or a stereoscopic video section.

A sample is a data unit representing each frame among a series of time-contiguous video frames or a time-contiguous, compressed audio section. That is, in the multimedia streaming service providing apparatus 100, a sample of a fragment may be understood like a video frame.

To distinguish between sections of a monoscopic video section or a stereoscopic video section of the current fragment, the number of samples that form each section may be used. The fragment property information determining unit 120 may determine section sample number information representing the number of samples constituting the current section.

The fragment property information determining unit 120 may determine 3D composition information and sequencing order information with respect to samples constituting a current stereoscopic video regarding each stereoscopic video section of the current fragment.

The fragment property information determining unit 120 may determine at least one of stereoscopic camera information and stereoscopic display information for each stereoscopic video section of the current fragment.

The stereoscopic camera information includes information about a stereoscopic camera that has obtained samples constituting a current stereoscopic video section. The stereoscopic display data according to the present exemplary embodiment includes information about display standards for safe 3D presentation of the samples.

In order to identify an item to which the stereoscopic camera display information is applied, in the stereoscopic video section, the number of samples constituting each item may be used. The fragment property information determining unit 120 may determine data indicating the number of items to which the stereoscopic camera display information is applied, in the current stereoscopic video section of the current fragment.

Also, the fragment property information determining unit 120 may determine at least one of identification information of current stereoscopic camera display information that is referred in each item and information about a length of a section to which the stereoscopic camera display information is applied. Information about the length of the section to which the stereoscopic camera display information is applied may be represented by the number of samples constituting a current item regarding which the current stereoscopic camera display information is referred to.

The fragment property information determining unit 120 may determine 3D signaling information for each file.

The fragment property information determining unit 120 may determine 3D composition information and sequencing order information with respect to a stereoscopic video of a current file.

The fragment property information determining unit 120 may determine stereo mono fragment change count information indicating the count of changes of a stereo fragment formed of a monoscopic video section and a stereo fragment formed of a stereoscopic video section, among videos of the current file.

While transmitting 3D composition information of the current file, the sequencing order information, and the stereo mono fragment change count information, the streaming unit 130 may further transmit at least one of stereo mono-section change count information, section sample number information, and stereo verification information, for each fragment of a current file.

The fragment property information determining unit 120 may determine identification information of each stereoscopic video section from among at least one stereoscopic video section of the current fragment.

The fragment property information determining unit 120 may determine relationship information for referring to a plurality of videos when forming a correlative reference relationship between a plurality of videos including the current video. The relationship information may include index information, location information of a reference video, or the like.

The fragment property information determining unit 120 may determine location information of reference videos that are referred to in order to constitute a stereoscopic video with respect to a video of the current file. The location information of the reference videos according to the present exemplary embodiment may be determined by using at least one of reference video identification information within the current file, remote location information outside the current file, and uniform resource locator (URL) information and uniform resource name (URN) information of the reference videos.

The fragment property information determining unit 120 may determine number information of the reference videos when a video of the current file refers to a plurality of videos. The fragment property information determining unit 120 may determine at least one of reference index information for identifying a plurality of reference videos and location information about each of the reference videos.

The multimedia streaming service providing apparatus 100 may provide differentially encoded videos according to video image quality in order to provide a safe streaming service regarding multimedia contents according to a network status. The multimedia streaming service providing apparatus 100 differentially encodes a video according to video quality, thereby forming a multi-channel video group including videos of multiple channels.

The fragment property information determining unit 120 may determine multi-channel number information indicating the number of videos of different channels that may replace a video of the current file. Also, the fragment property information determining unit 120 may determine reference information indicating a position of a video of a different channel from among the multi-channel video group.

Figure 2:
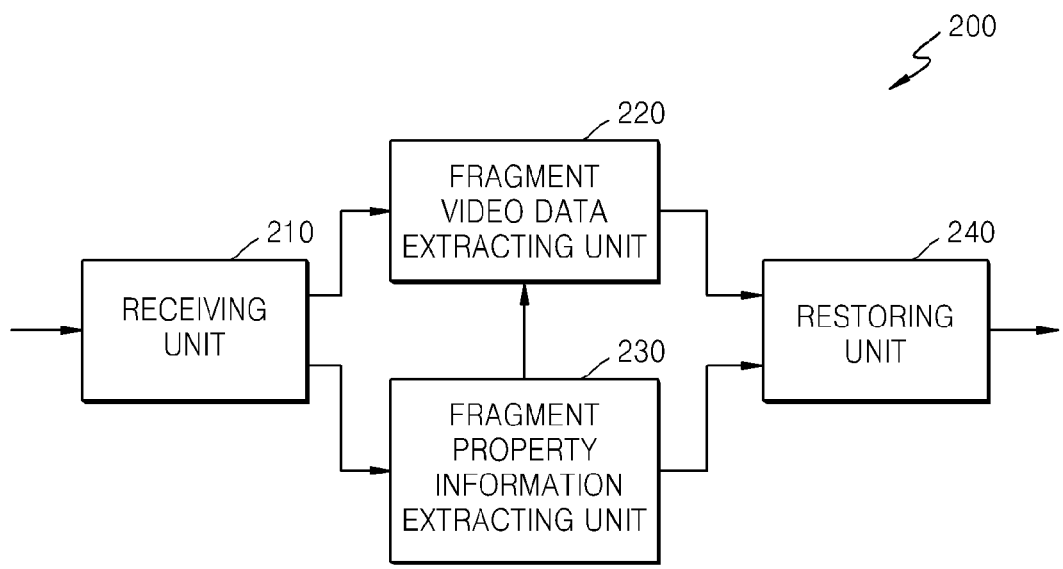
FIG. 2 is a block diagram illustrating an apparatus for receiving a multimedia streaming service according to an exemplary embodiment.

FIG. 2 is a block diagram illustrating a multimedia streaming service receiving apparatus 200 according to an exemplary embodiment.

The multimedia streaming service receiving apparatus 200 may receive fragments of streaming data via a network and extract property information including at least one of 3D signaling information and relationship information of each file, each fragment, and each sample to extract corresponding video data so as to restore a 2D video, a 3D video, or a mixed video of 2D video and 3D video.

The multimedia streaming service receiving apparatus 200 according to the present exemplary embodiment includes a receiving unit 210 (e.g., receiver), a video data extracting unit 220 (e.g., video data extractor), a fragment property information extracting unit 230 (e.g., fragment property information extractor), and a restoring unit 240 (e.g., restorer).

The receiving unit 210, the video data extracting unit 220, the fragment property information extracting unit 230, and the restoring unit 240 may closely cooperate with one another by exchanging data with one another according to a control of a CPU or a processor included inside or outside the multimedia streaming service receiving apparatus 200. Alternatively, at least one of the receiving unit 210, the video data extracting unit 220, the fragment property information extracting unit 230, and the restoring unit 240 may be operated by using a processor mounted in the multimedia streaming service receiving apparatus 200 and may be controlled to closely cooperate with other components.

The receiving unit 210 continuously receives a plurality of fragments via network streaming.

The video data extracting unit 220 extracts encoded data of a video including at least one of a 2D video and a 3D video in a form divided into fragments from a media data area for each of the fragments that are received by using the receiving unit 210.

The fragment property information extracting unit 230 parses property information from an auxiliary data area received by using the receiving unit 210. The property information extracting unit 230 may read property information such as data for 2D or 3D reproduction of video of fragment, contents relevance characteristics, data structure, and relationship information about a plurality of videos, based on the parsed property information.

The restoring unit 240 restores encoded video data of fragments to a 2D video or a 3D video based on 3D signaling information or relationship information read from property information of each fragment by using the fragment property information extracting unit 230.

The fragment property information extracting unit 230 may extract at least one of 3D composition information set with respect to a current video for each fragment, sequencing order information, and stereo mono-section change count.

The property information extracting unit 230 may read a form by which a left image and a right image constitute a stereoscopic image of a current fragment based on 3D composition information of the current fragment.

The property information extracting unit 230 may read a sequencing order of a pair of a left image and a right image in a stereoscopic image of the current fragment based on the sequencing order information of the current fragment.

The property information extracting unit 230 may read a change count of a monoscopic video section and a stereoscopic video section based on the stereo mono-section change count information of the current fragment.

The monoscopic video section or the stereoscopic video section of the current fragment may be detected by using the number of samples constituting respective sections. The property information extracting unit 230 may extract at least one of stereo verification data and section sample number information regarding each fragment.

The property information extracting unit 230 may determine whether a current section of the current fragment is a monoscopic video section or a stereoscopic video section, based on stereo verification data of the current fragment.

The property information extracting unit 230 may determine the number of samples constituting a current section based on section sample number information of the current fragment.

The property information extracting unit 230 may extract at least one of 3D composition information and sequencing order information for each stereoscopic video section of the current fragment.

The property information extracting unit 230 may read 3D composition information with respect to samples constituting a current stereoscopic video section based on 3D composition information of the current stereoscopic video section of the current fragment.

The property information extracting unit 230 may read sequencing order information with respect to samples constituting the current stereoscopic video section based on the sequencing order information of the current stereoscopic video section of the fragment.

The property information extracting unit 230 may extract stereoscopic camera display information for each stereoscopic video section of video data of the current fragment.

The property information extracting unit 230 may read data about a stereoscopic camera that has obtained samples constituting the current stereoscopic video section and data about display standards for safe 3D presentation by using the samples from the stereoscopic camera display information of the current stereoscopic video section.

The property information extracting unit 230 may detect an item to which stereoscopic camera display information is applied by using the number of samples constituting each item in the stereoscopic video section.

The property information extracting unit 230 may extract and read at least one of information indicating the number of items to which stereoscopic camera display information is applied, identification information of the current stereoscopic camera display information that is referred to in each of the items, and information about a length of a section to which the current stereoscopic camera display information is applied, in the current stereoscopic video section of the current fragment.

The property information extracting unit 230 may detect an item to which the current stereoscopic camera display information is applied, from among a current stereoscopic video section by using the extracted data.

The property information extracting unit 230 may extract at least one of 3D composition information about a video of a current file, sequencing order information, and information about a stereo mono fragment change count with respect to a video of a current file.

The property information extracting unit 230 may read a form by which a left image and a right image form a stereoscopic image of a current file based on the 3D composition information of the current file. The property information extracting unit 230 may read a sequencing order of a pair of the left image and the right image constituting a stereoscopic image of a current file based on sequencing order information about a video of the current file.

The property information extracting unit 230 may read a count of changes of a mono fragment formed of a monoscopic video section and a stereo fragment formed of a stereoscopic video section of a video of the current file based on stereo mono fragment change count information of the current file.

The property information extracting unit 230 may extract at least one of 3D composition information of a video of the current file, sequencing order information, and stereo mono fragment change count information, and may extract and read at least one of stereo mono-section change count information, section sample number information, and stereo verification information with respect to a video of a current fragment.

Alternatively, the property information extracting unit 230 may extract and read identification information about each stereoscopic video section from among at least one stereoscopic video section of video data of the current fragment. A current stereoscopic video section may be detected based on the identification information of the read stereoscopic video section.

When a video of the current file refers to at least one video, the property information extracting unit 230 may extract and read relationship information indicating reference relationships between a plurality of videos.

With respect to another video that is referred to in order to constitute a stereoscopic video of the current file, the property information extracting unit 230 may extract and read at least one of location information of the reference videos, reference video identification information, remote location information of the reference videos outside the current file, and URL information and URN information of the reference videos. The restoring unit 240 may detect a video that is referred to by using the read information and restore a stereoscopic image of the current file.

When video data of the current file refers to a plurality of videos, the property information extracting unit 230 may extract and read at least one of number information of reference videos, reference index information for identifying a plurality of reference videos, and location information of the reference videos from the current file. The restoring unit 240 may restore a video of the current file by selectively detecting a video that is referred to by using the read information.

In order to safely receive a streaming service of multimedia contents according to a network status, the multimedia streaming service receiving apparatus 200 may receive an adaptive streaming service based on a multi-channel video group including videos of a plurality of channels that are differentially encoded according to video quality. The multimedia streaming service receiving apparatus 200 may selectively receive a video of a predetermined channel depending on a network status from among the videos that are graded according to multiple channels and according to video quality.

The property information extracting unit 230 may extract and read at least one of multi-channel number information indicating the number of videos of different channels of the current file and reference information indicating location of the videos of the different channels. The restoring unit 240 may restore a video by combining videos of the different channels that are selected and received, by using the extracted number information of the multi-channel and reference information.

The multimedia streaming service receiving apparatus 200 may present a 2D video or a 3D video that are restored by using the restoring unit 240, in 2D or 3D, based on the information that is read from the 3D signaling information or the relationship information of each fragment.

Figure 3:
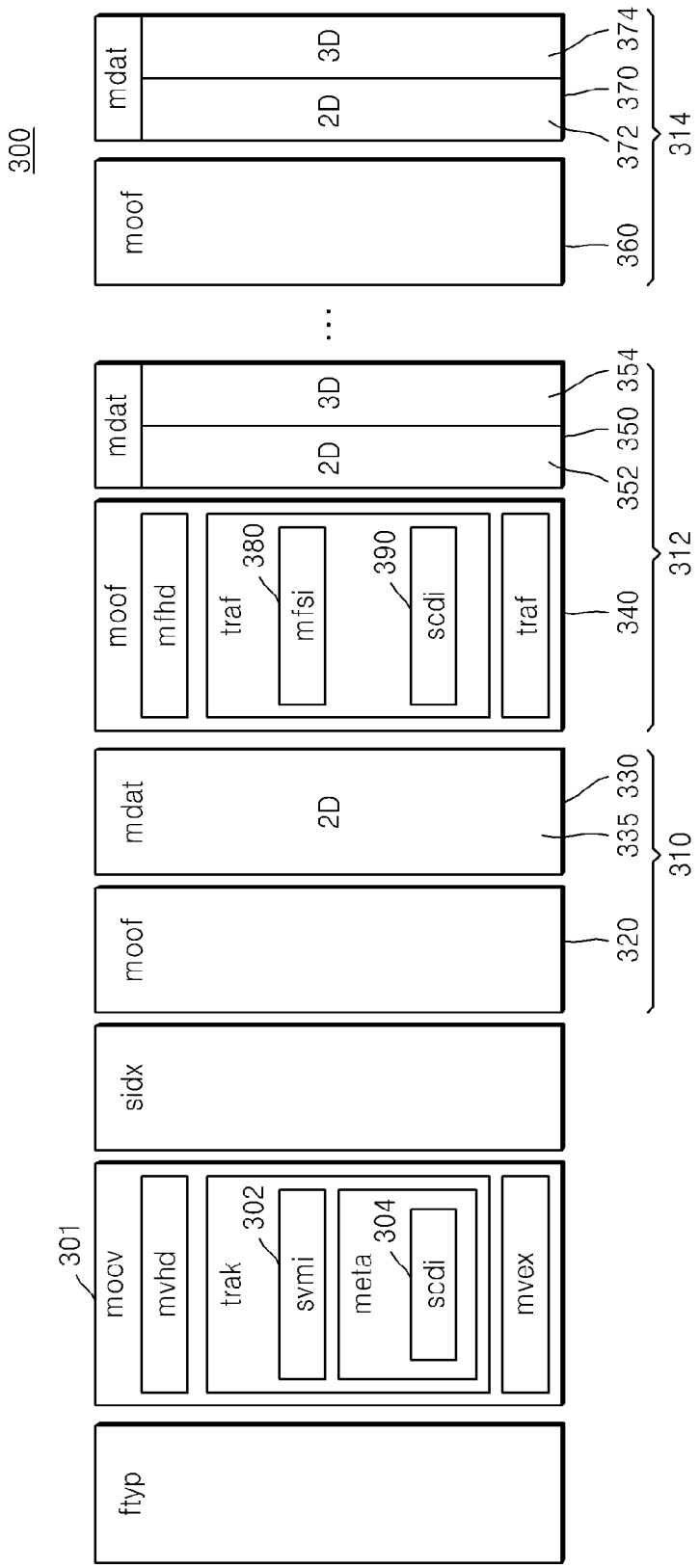
FIG. 3 illustrates an mfsi box including a streaming file format transmitted for each fragment unit and 3D signaling information that is transmitted for each fragment, according to an exemplary embodiment.

FIG. 3 illustrates an mfsi box including a streaming file format 300 transmitted for each fragment and 3D signaling information that is transmitted for each fragment, according to an exemplary embodiment.

The multimedia streaming service providing apparatus 100 may transmit encoded video data of a 2D video or a 3D video and auxiliary data including various property information about a transmitted video by recording the video data and the auxiliary data in a data stream according to the streaming file format 300.

The streaming file format 300 may include a ftyp box, a moov box 301, and a sidx box, and a plurality of fragments 310, 312, and 314. The fragments 310, 320, and 330 include moof boxes 320, 340, and 360 and mdat boxes 330, 350, and 370, respectively.

The streaming file format 300 may be transmitted while including encoded video data of stereoscopic contents. The ftyp box includes file type information of a current file according to the streaming file format 300. The sidx box includes segment index information for searching for each segment in the current file.

The moov box 301 may include time information and space information of a video of the current file and information about a data structure of the current file. The moov box 301 of the streaming file format 300 includes a svmi box 302 and a scdi box 304.

The svmi box 302 may include various information such as stereoscopic visual type information of a stereoscopic video transmitted via the current file according to the streaming file format 300, mixed contents of 2D/3D contents, and fragment-related information. For example, the fragment-related information may include information about the number of fragments, the number of continuous samples, and information about whether a current sample is stereoscopic data.

The scdi box 304 may include various information regarding a stereoscopic camera related to a stereoscopic video transmitted via the current file, display standards, and visual stability.

The multimedia streaming service providing apparatus 100 may transmit encoded data of a current video by dividing the encoded data into fragments according to the streaming file format 300. The mdat boxes 330, 350, and 370 of the fragments 310, 312, and 314 may respectively include video data that is divided into fragments. For example, the mdat box 330 includes divided data of a 2D video 335, and the mdat box 350 may include divided data of a mixed video of a 2D video 352 and a 3D video 354, and the mdat box 370 may include divided data of a mixed video of a 2D video 372 and a 3D video 374.

The moof boxes 320, 340, and 360 of the fragments 310, 312, and 314 may respectively include time information and space information of a video that is inserted into the mdat boxes 350, 360, and 370 of the corresponding fragments 310, 312, and 314.

For example, the moof box 340 may include 3D signaling information about current videos 352 and 354 that are inserted into the mdat box 350 of the fragment 312.

For example, the moof box 340 may include a mfsi box 380 and a scdi box 390. The mfsi box 380 and the scdi box 390 may include 3D signaling information about the current videos 352 and 354 inserted into the mdat box 340.

The multimedia streaming service receiving apparatus 200 may receive and parse a data stream according to the streaming file format 300 and extract encoded video data of a 2D video or a 3D video and auxiliary data including various property information about the received videos.

The multimedia streaming service receiving apparatus 200 may restore the 2D or 3D video by extracting 3D signaling information about a video from the mfsi box 380 and the scdi box 390 according to the streaming file format 300.

FIG. 4 illustrates a syntax of 3D signaling information included in a mfsi box and a scdi box according to an exemplary embodiment.

The mfsi box may include stereoscopic visual type information as 3D signaling information about a video that is inserted into a current fragment.

The stereoscopic visual type information according to an exemplary embodiment may include 3D composition information 'stereoscopic_composition_type', sequencing order information 'is_left_first', and stereo mono-section change count information 'stereo_mono_change_count'.

The 3D composition information 'stereoscopic_composition_type' denotes a composition of a left image and a right image of a video of a current fragment, which form a stereoscopic image. A stereoscopic image type that is identified by the 3D composition information of a stereoscopic image according to the present exemplary embodiment may be a side-by-side type in which a left image and a right image are arranged in parallel on the left and right sides within a stereoscopic image, a top-and-bottom type in which a left image and a right image are arranged vertically, a field (frame) sequential type in which a left image and a right image are alternately arranged, a type in which a left image sequence and a right image sequence are individually transmitted, etc.

The sequencing order information 'is_left_first' denotes a sequencing order in which a left image and a right image are arranged within a stereoscopic image of a current fragment. For example, by using the sequencing order information 'is_left_first', whether a left image and a right image are arranged as a side by side type, in which either a left image and a right image or a right image and a left image are sequentially arranged in left and right areas of a stereoscopic image, respectively, or as a top and bottom type, in which either a left image and a right image or a right image and a left image are sequentially arranged in top and bottom areas of a stereoscopic image, respectively, may be identified.

The stereo mono-section change count information may denote a count of changes of a monoscopic video section and a stereoscopic video section if a current fragment includes a video formed of continuous sections of a monoscopic video section or a stereoscopic video section.

Regarding a current fragment, stereo verification information 'stereo_flag' indicating whether the current fragment is a monoscopic video or a stereoscopic video may be transmitted. The stereoscopic visual type information may include stereo verification information 'stereo_flag' for indicating whether a video section of a current fragment is a monoscopic video section or a stereoscopic video section.

Also, the stereoscopic visual type information may include sample number information 'sample_count' indicating the number of samples forming a current section for each video section of a current fragment.

Also, the stereoscopic visual type information may include 3D composition information 'stereoscopic_composition_type' and sequencing order information 'is_left_first' with respect to a stereoscopic video section of a current fragment.

Accordingly, for each stereoscopic video section of the current fragment, 3D composition information about a composition of a stereoscopic image formed by a left image and right image and sequencing order information about a sequence in which a pair of a left image and a right image are arranged may be transmitted.

As 3D signaling information, a scdi box including at least one of stereoscopic camera information and stereoscopic display information may be transmitted for each stereoscopic video section of a current fragment.

Like a syntax of the mfsi box of FIG. 4, the scdi box according to the present exemplary embodiment may be included in a mfsi box. As illustrated in FIG. 3, the mfsi box 380 and the scdi box 390 regarding video data of the current fragment may be transmitted.

The stereoscopic visual type information according to the present exemplary embodiment may include information 'scdi_item_count' about a stereoscopic video section from among the current fragment.

The information 'scdi_item_count' may indicate the number of items to which stereoscopic camera display information is applied. For example, an item to which the stereoscopic camera display information is applied refers to a section in which 3D video data is included. In this case, the information 'scdi_item_count' may indicate the number of items or samples which are in a 3D video data section included in the current fragment.

The scdi box according to the present exemplary embodiment may include identification information 'scdi_ID' of the stereoscopic camera display information.

As stereoscopic camera display information of the scdi box 370 of the moov box 350 or stereoscopic camera display information of other scdi boxes of the moof boxes 320, 340, and 360 may be used as the stereoscopic camera display information, the scdi box, which is to be referred to, may be searched by using 'schi_ID'.

For each item or sample to which the stereoscopic camera display information is applied, information 'scdi_ID' and information 'scdi_duration' may be transmitted. The information 'scdi_duration' may denote a length of an item or a sample to which the current stereoscopic camera display information is applied. Accordingly, the current stereoscopic camera display information about the current fragment may be transmitted in units of items or samples that form a stereoscopic video section.

Accordingly, based on the multimedia streaming file format 300 of FIG. 3 and the syntax of the msfi box and the scdi box of FIG. 4, a video including a monoscopic video or a stereoscopic video may be transmitted or received in units of fragments, and 3D signaling information about the video may be transmitted or received for each fragment.

In addition, with respect to a monoscopic video section or a stereoscopic video section in a fragment, information about the number of samples forming each section may be transmitted or received. Also, stereoscopic camera display information about a video of a fragment may be transmitted in units of items or samples.

Figure 5:
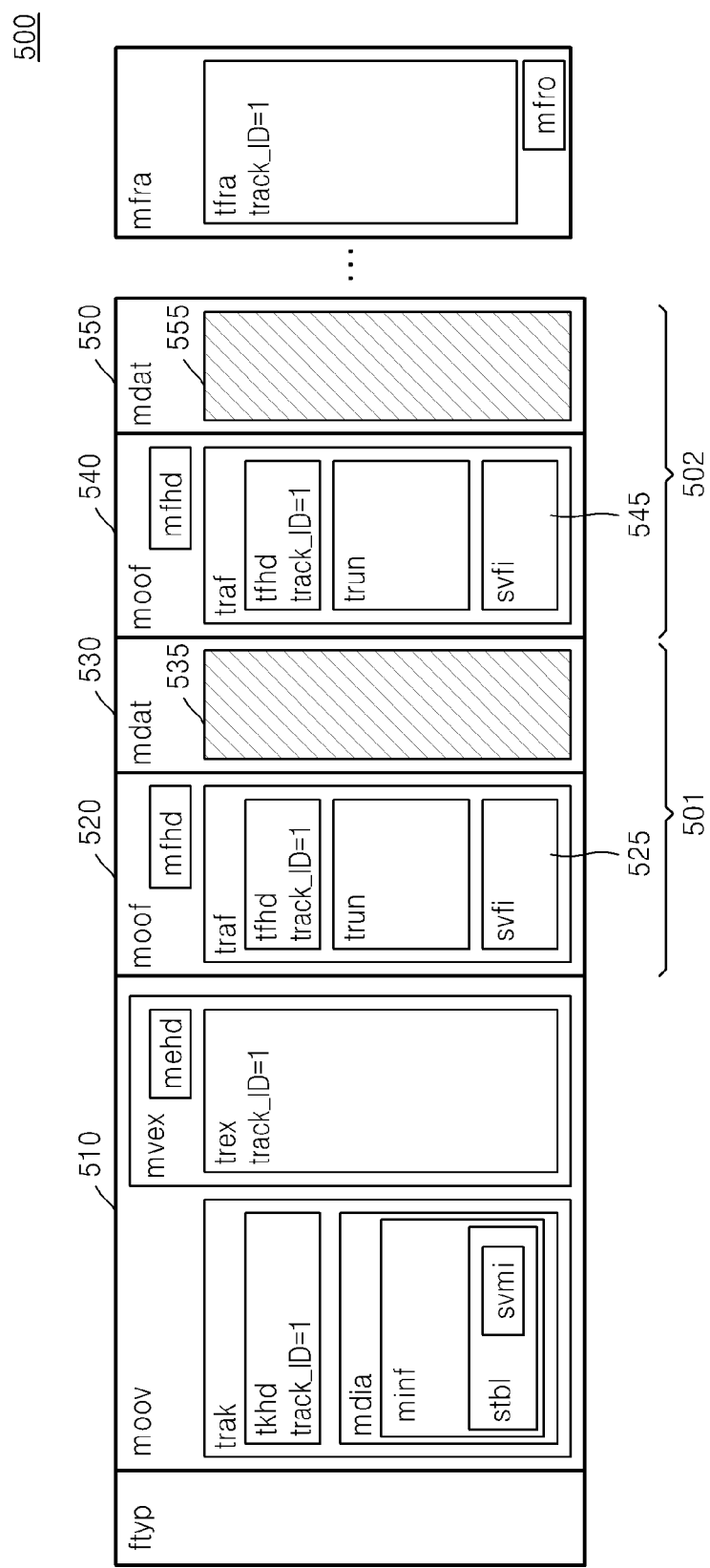
FIG. 5 illustrates an svfi box including a streaming file format transmitted for each fragment and 3D signaling information transmitted for each fragment according to an exemplary embodiment.

FIG. 5 illustrates a svfi box including a streaming file format transmitted in units of fragments and 3D signaling information transmitted for each fragment according to an exemplary embodiment.

The multimedia streaming service providing apparatus 100 may transmit encoded video data of a 2D video or a 3D video and auxiliary data including various property information about the transmitted data by recording the same in a data stream according to a streaming file format 500 according to an exemplary embodiment.

The streaming file format 500 may include a ftyp box, a moov box 510, a plurality of fragments 501 and 520 respectively including moof boxes 520 and 540 and mdat boxes 530 and 550, and a mfra box.

A trak box included in the moov box 510 includes data for searching a track during presentation. Presentation refers to at least one motion sequence which may be coupled to audio, and a track refers to a set of interrelated samples, for example, an image sequence of a video.

A tkhd box included in the trak box refers to a track header including any information about a current track, and a mdia box includes declaration information about media of the current track. A minf box included in the mdia box includes any object that declares property information of current media, and a stbl box includes indexing information such as time, data, and location of a sample that is used in searching for samples of the current track. A svmi box of the stbl box may include information about a stereoscopic video of a current media of the current track.

A mvex box included in the moov box 510 includes information that notifies that a fragment of a video is being transmitted via a current file. A trex box included in the mvex box includes default value data related to a sample used in the fragments 501 and 502.

Encoded data of a monoscopic video, a stereoscopic video, or a mixed video may be transmitted via the mdat boxes 530 and 550 of the fragments 501 and 502. The mfhd box included in the moof boxes 520 and 540 includes information about identification (e.g., a serial number) of each fragment in the current file.

A traf box included in the moof boxes 520 and 540 includes at least one track fragment forming each track of a current fragment. Each track fragment includes at least one track run describing a series of samples. A trun box included in the traf box includes information about a current track run.

The mfra box includes random access point information in order to randomly access each fragment. The tfra box includes location information of randomly accessible samples and presentation time information.

The multimedia streaming service providing apparatus 100 may transmit svfi boxes 525 and 545 including 3D signaling information that is transmitted for each fragment via the streaming file format 500 transmitted in units of fragments.

In the svfi boxes 525 and 545, 3D signaling information of videos 535 and 555 inserted into the mdat boxes 530 and 550 of the current fragments 501 and 502 may be recorded.

For example, the multimedia streaming service providing apparatus 100 may insert a svfi box into a traf box which is a sub-box of the moof boxes 520 and 540 and transmit the same.

The multimedia streaming service receiving apparatus 200 may receive and parse a data stream according to the streaming file format 500 so as to extract encoded video data of a 2D video or a 3D video and auxiliary data including of various property information about the received video data.

The multimedia streaming service receiving apparatus 200 may extract 3D signaling information about video data from the svfi boxes 525 and 545 or the svmi box according to the streaming file format 500 according to the present exemplary embodiment so as to restore a 2D video or a 3D video.

FIGS. 6 and 7 illustrate a syntax of 3D signaling information included in a svfi box according to an exemplary embodiment.

3D signaling information of a video that is transmitted via a current fragment may be transmitted or received via the svfi box according to the present exemplary embodiment.

The 3D signaling information of the svfi box illustrated in FIGS. 6 and 7 may include stereo mono-section change count information 'stereo_mono_change_count' of a video of a current fragment. By using the stereo mono-section change count information 'stereo_mono_change_count', a monoscopic video section and a stereoscopic video section may be searched in the current fragment. The 3D signaling information of the svfi box according to the present exemplary embodiment may include sample number information 'sample_count' and stereo verification information 'stereo_flag' regarding a stereoscopic video section in the current fragment.

The 3D signaling information of the svfi box illustrated in FIG. 7 may further include information 'stereo_section_ID' for identifying a stereoscopic video section. When the current fragment includes a plurality of stereoscopic video sections, each stereoscopic video section may be identified by using stereo section identification information 'stereo_section_ID'.

FIG. 8 illustrates a syntax of 3D signaling information that is set with respect to a file in a streaming file format transmitted in units of fragments according to an exemplary embodiment.

The multimedia streaming service providing apparatus 100 may transmit 3D composition information and sequencing order information in a file channel of the streaming file format 500. 3D composition information 'stereoscopic_composition_type' and sequencing order information 'is_left_first' about a video of a current file may be inserted into a svmi box included in a moov box.

The multimedia streaming service receiving apparatus 200 may parse the svmi box included in the moov box of the streaming file format 500 to extract a 'stereoscopic_composition_type' field and a 'is_left_first' field and read with respect to a video of a current file that is received via the streaming file format 500, information about a form by which a stereoscopic image is formed, and information about a sequencing order of a pair of a left image and a right image in the stereoscopic image.

FIG. 9 illustrates a syntax of 3D signaling information that is set with respect to a sample in a streaming file format transmitted in units of fragments according to an exemplary embodiment.

The multimedia streaming service providing apparatus 100 may transmit stereo verification information in a track, fragment, or sample channel of the streaming file format 500.

The syntax illustrated in FIG. 9 corresponds to a syntax of a trex box included in a moov box or a tfhd box or a trun box included in a moof box, to which stereo verification information 'stereo_flag' according to an exemplary embodiment is added.

That is, stereo verification information 'stereo_flag' about a video of a current track may be inserted into the trex box included in the moov box to be transmitted. Alternatively, stereo verification information 'stereo_flag' about a video of a current fragment may be inserted into the tfhd box included in the moof box to be transmitted. Alternatively, stereo verification information 'stereo_flag' about a video of a sample constituting a current fragment may be inserted into the trun box included in the moof box to be transmitted.

The multimedia streaming service receiving apparatus 200 may extract 'stereo_flag' by parsing the trex box included in the moov box or the tfhd box or the trun box included in the moof box of the streaming file format 500, and may read whether a video of a current track, a current fragment, or a current sample received via the streaming file format 500 is a monoscopic type or a stereoscopic type.

Figure 10:
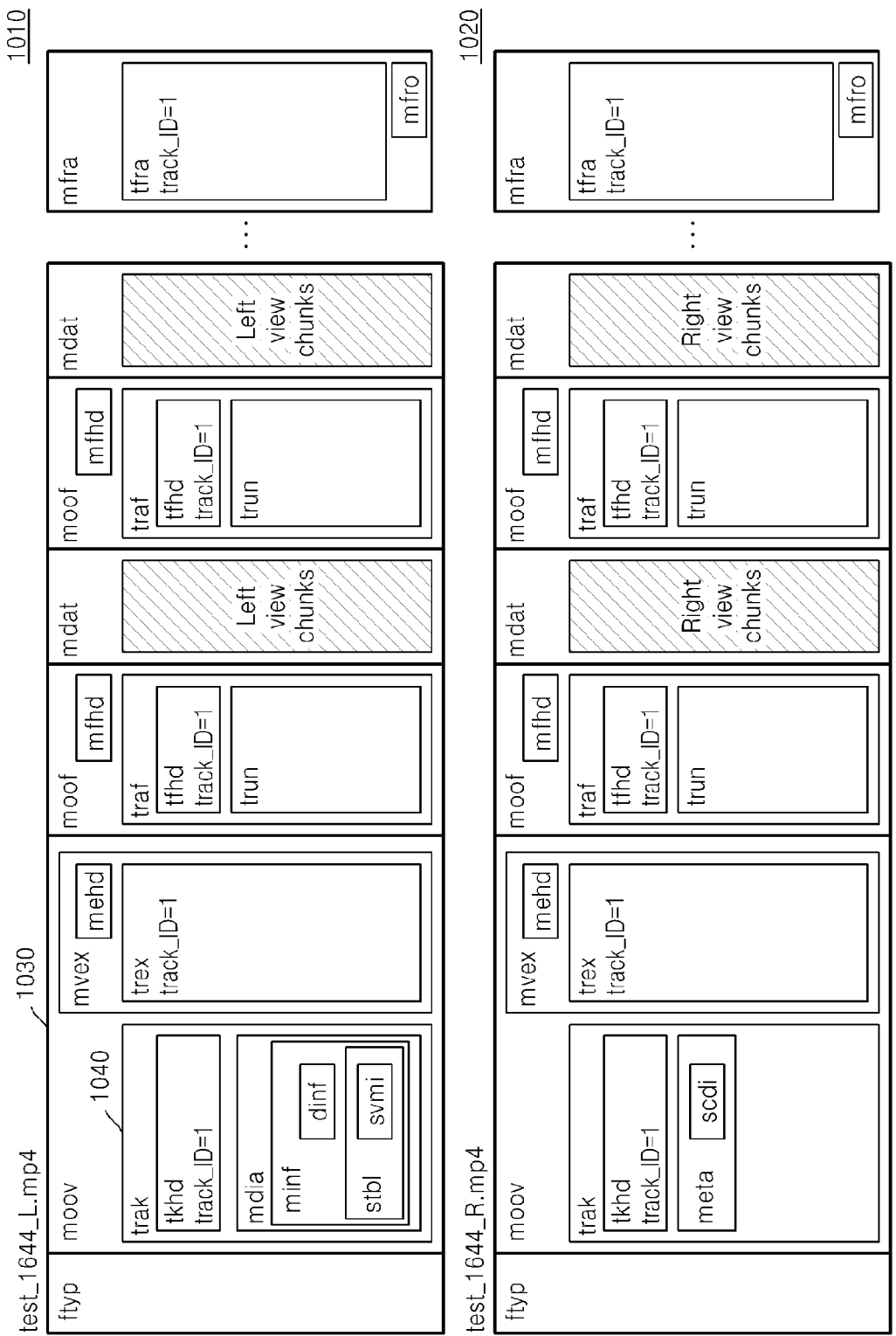
FIG. 10 illustrates two streaming file formats for transmitting a left video and a right video of a stereoscopic video according to an exemplary embodiment.

FIG. 10 illustrates two streaming file formats for transmitting a left video and a right video of a stereoscopic video according to an exemplary embodiment.

The multimedia streaming service providing apparatus 100 may transmit a left view elementary stream (ES) and a right view ES respectively including a left video and a right video which form a stereoscopic video. Also, the multimedia streaming service providing apparatus 100 may insert a left view ES into a left video file 'test_1644_L.mp4' 1010 and a right view ES into a right video file 'test_1644_R.mp4' 1020 based on the streaming file format 500 and transmit the same.

That is, in order to transmit a stereoscopic video, the multimedia streaming service providing apparatus 100 may transmit two ESs via streaming of two files.

The multimedia streaming service providing apparatus 100 may transmit relationship information including reference information about another video that is referred to in order to form a stereoscopic video of a current file and location information of the referred video. For example, the multimedia streaming service providing apparatus 100 may insert information such as a reference type and location information of a reference video, into a trak box 1040, which is a sub-box of a moov box 1030 and transmit the same.

The multimedia streaming service providing apparatus 100 may parse a received left video file to extract and read the reference type of the video that is referred in order to form a stereoscopic video of a current file and location information of the referred video.

The multimedia streaming service receiving apparatus 200 may detect a streaming file through which the referred video is received, by using the read data to thereby restore a stereoscopic image by combining videos extracted from the referred video.

FIG. 11 illustrates relationship information that is set with respect to a stereoscopic video included in a file according to an embodiment of the present invention.

The multimedia streaming service providing apparatus 100 may insert the relationship information for searching another video in order to constitute a stereoscopic video into a tref box 1110 included in the trak box which is a sub-box of the moov box of the streaming file format 500 according to an exemplary embodiment.

A track reference type box 1120 included in the trak box according to the present exemplary embodiment may include reference track identification information 'track_ID' to indicate a track in which a reference video regarding a video of a current track is included, for each track of a file.

Also, a track reference type URL box 1130 included in the trak box according to the present exemplary embodiment includes information 'entry_count' indicating the number of reference videos in order to indicate locations of a plurality of reference videos about a current track, for each track of a file, and may include location information 'location' of each reference video.

The location information 'location' according to the present exemplary embodiment may indicate a remote location of a reference video by a character row that is encoded in language such as UTF-8. Accordingly, the multimedia streaming service receiving apparatus 200 may sequentially parse the moov box, the trak box, and the tref box 1110 from a received streaming file to detect and refer to a video that is located in an external file of a current file.

Figure 12:
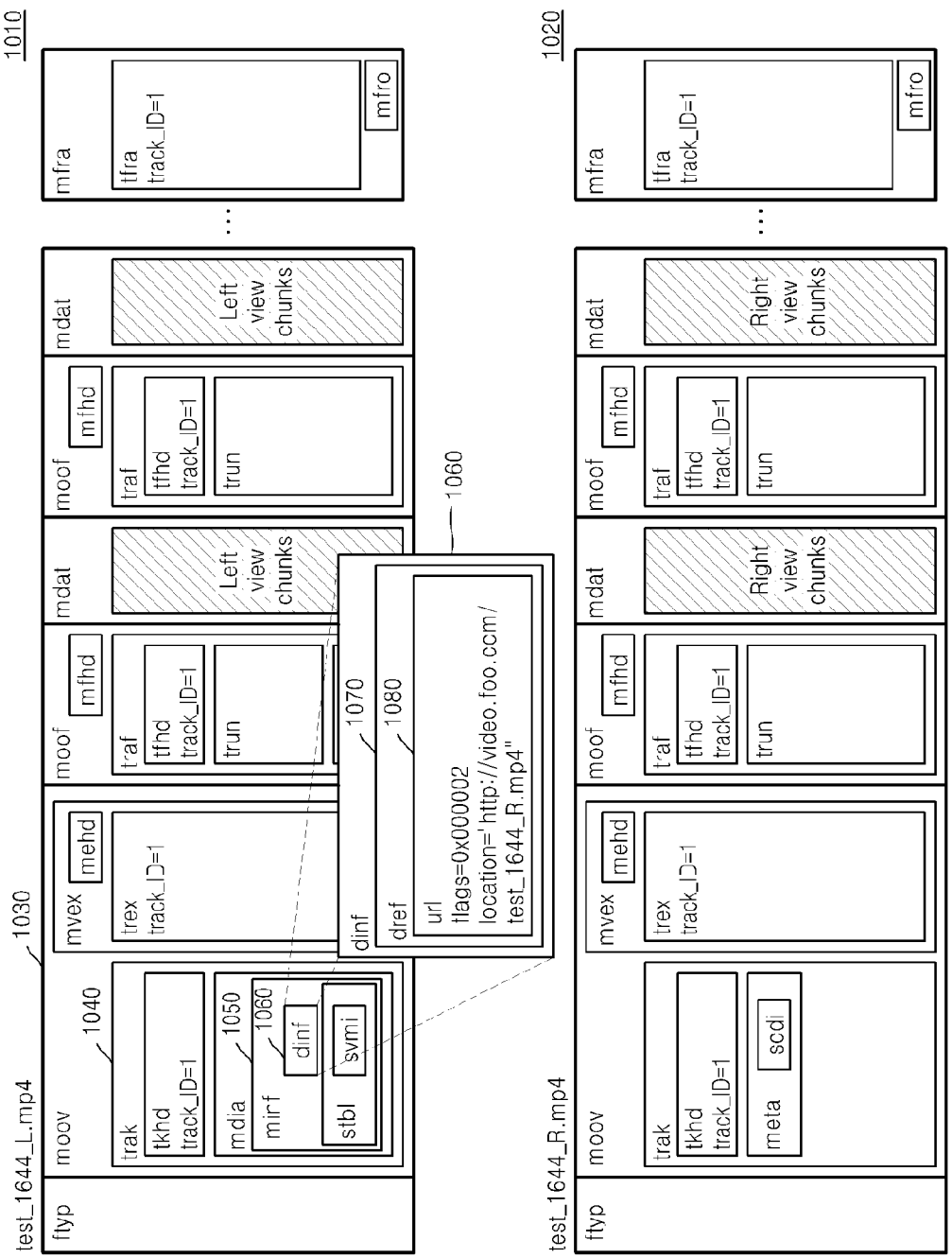
FIG. 12 illustrates one piece of relationship information that is set in a file when transmitting a stereoscopic video to two streaming files according to an exemplary embodiment.

FIG. 12 illustrates one piece of relationship information that is set in a file when transmitting a stereoscopic video to two streaming files, according to an exemplary embodiment.

The multimedia streaming service providing apparatus 100 may insert relationship information about another video which a video of a current track refers to, into a dinf box 1060, which is a sub-box of a minf box 1050 of a track box 1040 included in a moov box 1030 of 'test_1644_L.mp4' 1010, which is a left video file based on the streaming file format 500, and transmit the relationship information.

The dinf box 1060 according to the present exemplary embodiment includes a dref box 1070 for transmitting the relationship information, and the dref box 1070 may include reference URL information 1080 indicating a remote location of a reference track of the current track.

The reference URL information 1080 according to the present exemplary embodiment may include not only URL information 'location' but also a reference flag 'flags.' By using the reference flag 'flags' according to the present exemplary embodiment, it may be described that a current video is a left video or a basic viewpoint video from among a stereoscopic video and is included in a current file, and that a right video or an additional viewpoint video which are to be referred is included at a position indicated by 'location.'

That is, URL information 'location' of the reference URL information 1080 may indicate a remote position of a right video file 'test_1644_R.mp4' 1020. 'flags' of the reference URL information 1080 is transmitted via a current left video file 'test_1644_L.mp4' 1010, and it may be described that a reference video of the current video is being transmitted via a right video file 'test_1644_R.mp4' 1020 which is at a location indicated by 'location.'

If just the relationship information is recorded on the left video file 'test_1644_L.mp4' 1010 according to an exemplary embodiment, when a fragment of the left video file 'test_1644_L.mp4' 1010, in which a reference video is located, is requested, it may be recognized that a corresponding fragment of the right video file 'test_1644_R.mp4' 1020, in which an additional viewpoint video is located, is also be requested.

Figure 13:
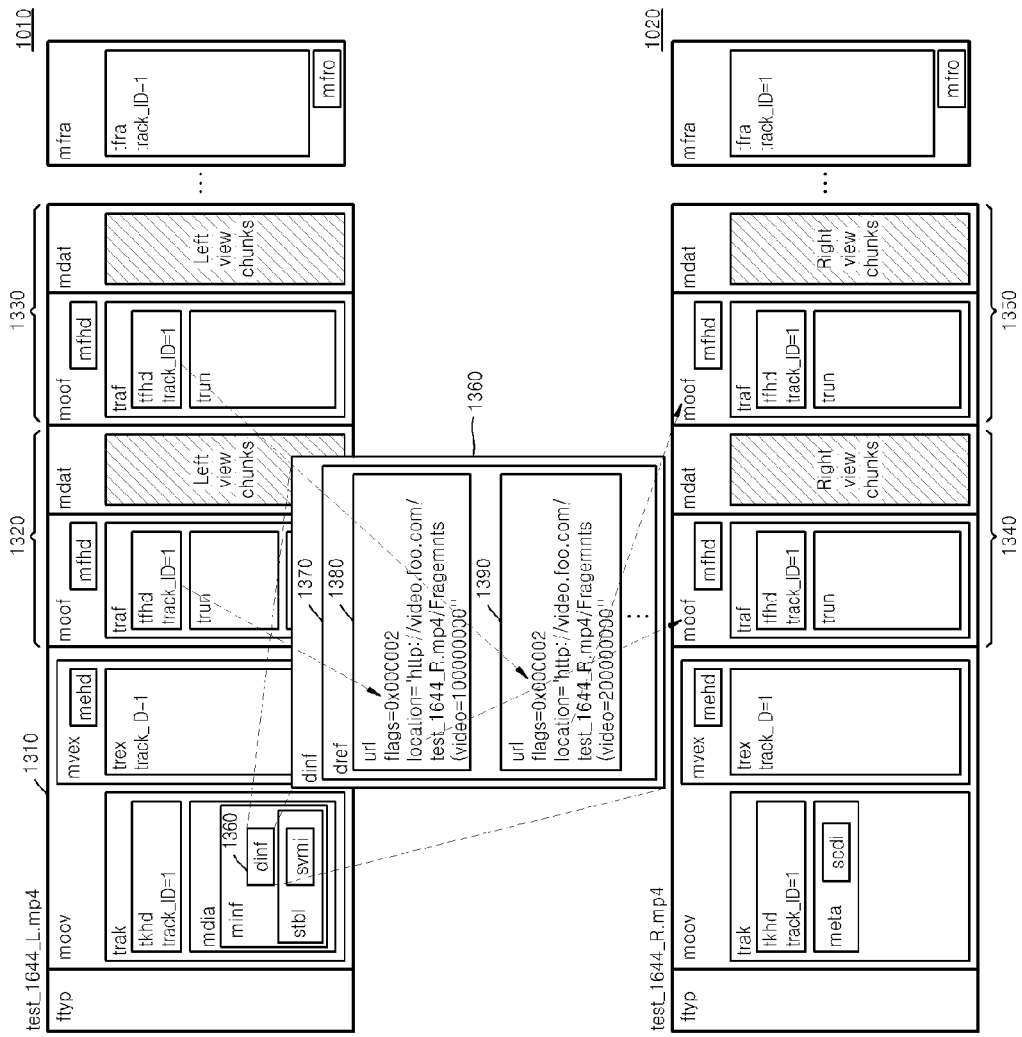
FIG. 13 illustrates a plurality of pieces of relationship information that is set in a file when transmitting a stereoscopic video to two streaming files according to an exemplary embodiment.

FIG. 13 illustrates a plurality of pieces of relationship information that is set in a file when transmitting a stereoscopic video via two streaming files according to an exemplary embodiment.

The multimedia streaming service providing apparatus 100 may insert reference information about a plurality of videos which a current video refers to, into a dinf box 1360 included in a moov box 1310 of the left video file 'test_1644_L.mp4'(1010) based on the streaming file format 500 and transmit the same.

For example, a dref box 1370 of the dinf box 1360 may include two pieces URL information, that is, first and second reference URL information 1380 and 1390 indicating remote locations of two reference videos of the current video.

The first reference URL information 1380 included in the dref box 1370 according to an exemplary embodiment includes information that is used to indicate a third fragment 1340 of the right video file 'test_1644_R.mp4' 1020, which is referred by a first fragment 1320 of a current video of the left video file 'test_1644_L.mp4' 1010.

In a similar manner, the second reference URL information 1390 included in the dref box 1370 includes information used to indicate a fourth fragment 1350 of the right video file 'test_1644_R.mp4' 1020, which is referred to by a second fragment 1330 of a current video of the left video file 'test_1644_L.mp4' 1010.

The multimedia streaming service receiving apparatus 200 may receive the left video file 'test_1644_L.mp4' 1010 to sequentially parse the moov box 1310, the dinf box 1360, and the dref box 1370 to thereby extract the first reference URL information 1380 and the second reference URL information 1390.

Based on 'flags' of the first reference URL information 1380, the multimedia streaming service receiving apparatus 200 may read that the first fragment 1320 of a current track is transmitted via the left video file 'test_1644_L.mp4' 1010, and a reference track of the first fragment 1320 is transmitted via a third fragment 1340 of the right video file 'test_1644_R.mp4' 1020, which is a location indicated by URL information of 'location,'

In a similar manner, the multimedia streaming service receiving apparatus 200 may read, based on 'flags' of the second reference URL information 1390, that the second fragment 1330 of a current track is transmitted via the left video file 'test_1644_L.mp4' 1010, and a reference track of the second fragment 1330 is transmitted via a fourth fragment 1350 of the right video file 'test_1644_R.mp4' 1020 which is a location indicated by URL information of 'location.'

FIG. 14 illustrates a syntax of a track information including relationship information about a plurality of reference videos when transmitting a stereoscopic video to two streaming files according to an exemplary embodiment.

If there are a plurality of reference videos regarding a current track of a file, the multimedia streaming service providing apparatus 100 may correlate the number of reference videos and locations of the respective reference videos with each other and transmit information indicating an index of location information of the reference videos.

For example, information indicating the number of reference videos 'entry_count' and location information of the respective reference videos 'location' of the dref box, which is a sub-box of a dinf box, may be linked to each other to thereby transmit 'data_reference_index' which indicates an index of location information of the reference videos via the dref box.

FIG. 15 illustrates a syntax of relationship information that is set in a file when transmitting a stereoscopic video to two streaming files according to an exemplary embodiment.

The multimedia streaming service receiving apparatus 200 according to the present exemplary embodiment may use a reference video location box 1510, a reference video name box 1520, and a reference entry box 1530 in order to notify a reference video of a current video.

For example, the reference video location box 1510 may include http or ftp based location information as location information 'location' of a reference video. The reference video name box 1520 may include URN information 'name' and location information 'location' of a reference video.

Via the reference entry box 1530 according to the present exemplary embodiment, number information 'entry_count' of a reference entry and reference information 'data_entry' determined based on information 'entry_flags' indicating an entry type of each reference entry may be transmitted.

For example, 'entry_flags=0x00001' indicates that a current video is inserted into a current file. If an entry flag according to an exemplary embodiment is 'entry_flags=0x000002', it may be described that a current video is a left video or a basic video of a stereoscopic video and is included in the current file, and that a right video or an additional viewpoint video which are to be referred to is included at a location indicated by 'location.'

FIG. 16 illustrates relationship information that is set using an index file outside a file when transmitting a stereoscopic video to two streaming files according to an exemplary embodiment.

The multimedia streaming service providing apparatus 100 may transmit relationship information for indicating a reference video of a current video by using an external index file describing index information about an external file.

Information about a plurality of components for a single content may be transmitted together via an external index file synchronized multimedia integration language (SMIL) according to an exemplary embodiment. That is, an external index file SMIL may include both index information 1010 regarding a current file and index information 1020 regarding a reference file of the current file.

The multimedia streaming service receiving apparatus 200 may extract relationship information of a reference video which a video of a current file refers to in order to compose a stereoscopic video, from the received streaming file, and read the number of reference videos, a reference index for identifying a plurality of reference videos, and locations of the respective reference videos. The multimedia streaming service receiving apparatus 200 may extract a reference video and combine the same with the current video so as to restore a stereoscopic video.

Alternatively, the multimedia streaming service receiving apparatus 200 may use an external index file to detect a reference video regarding the current video and combine the same with the current video to thereby restore a stereoscopic video.

Figure 17:
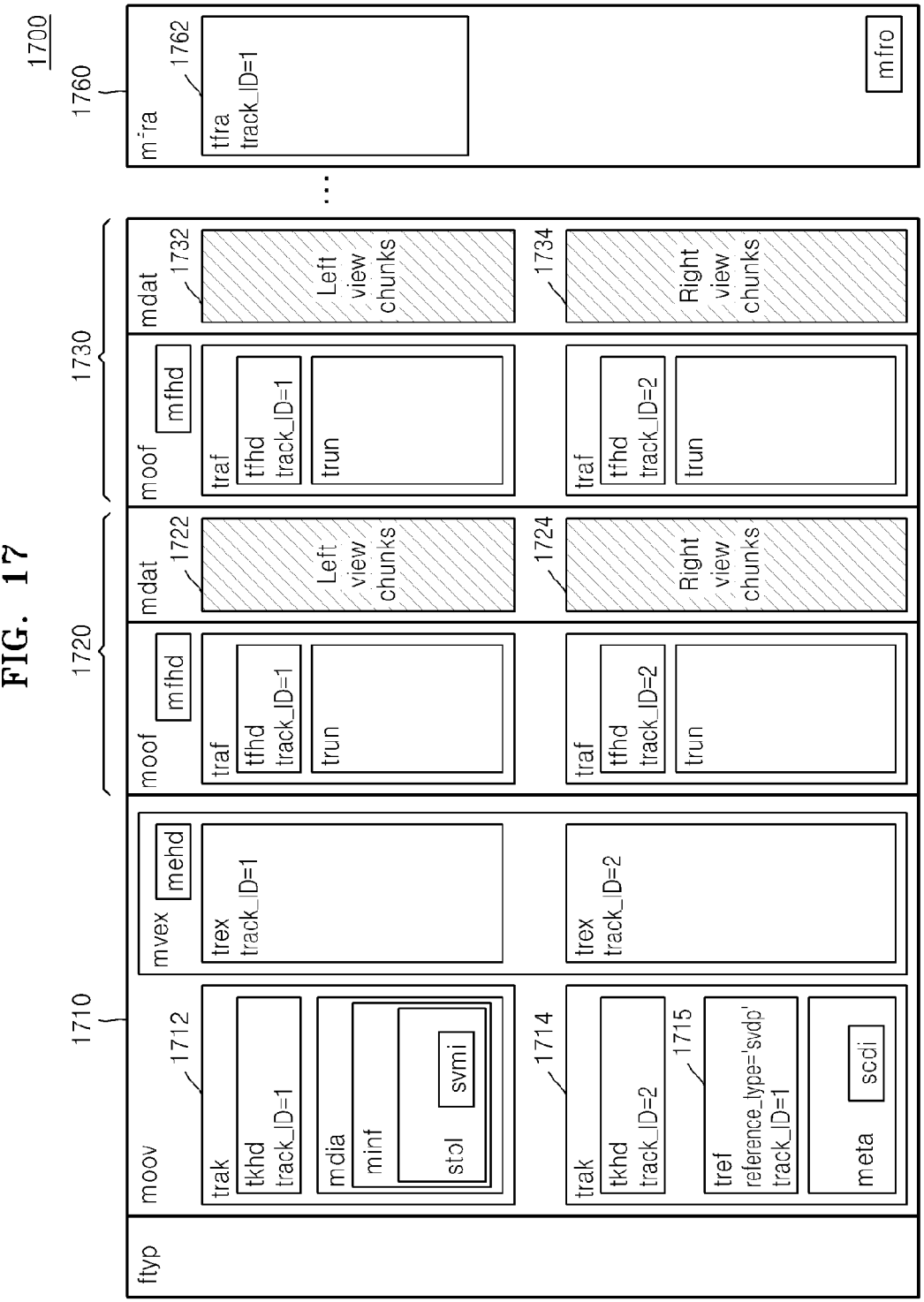
FIGS. 17 and 18 illustrate a streaming file format for transmitting a left video and a right video of a stereoscopic video according to an exemplary embodiment.
Figure 18:
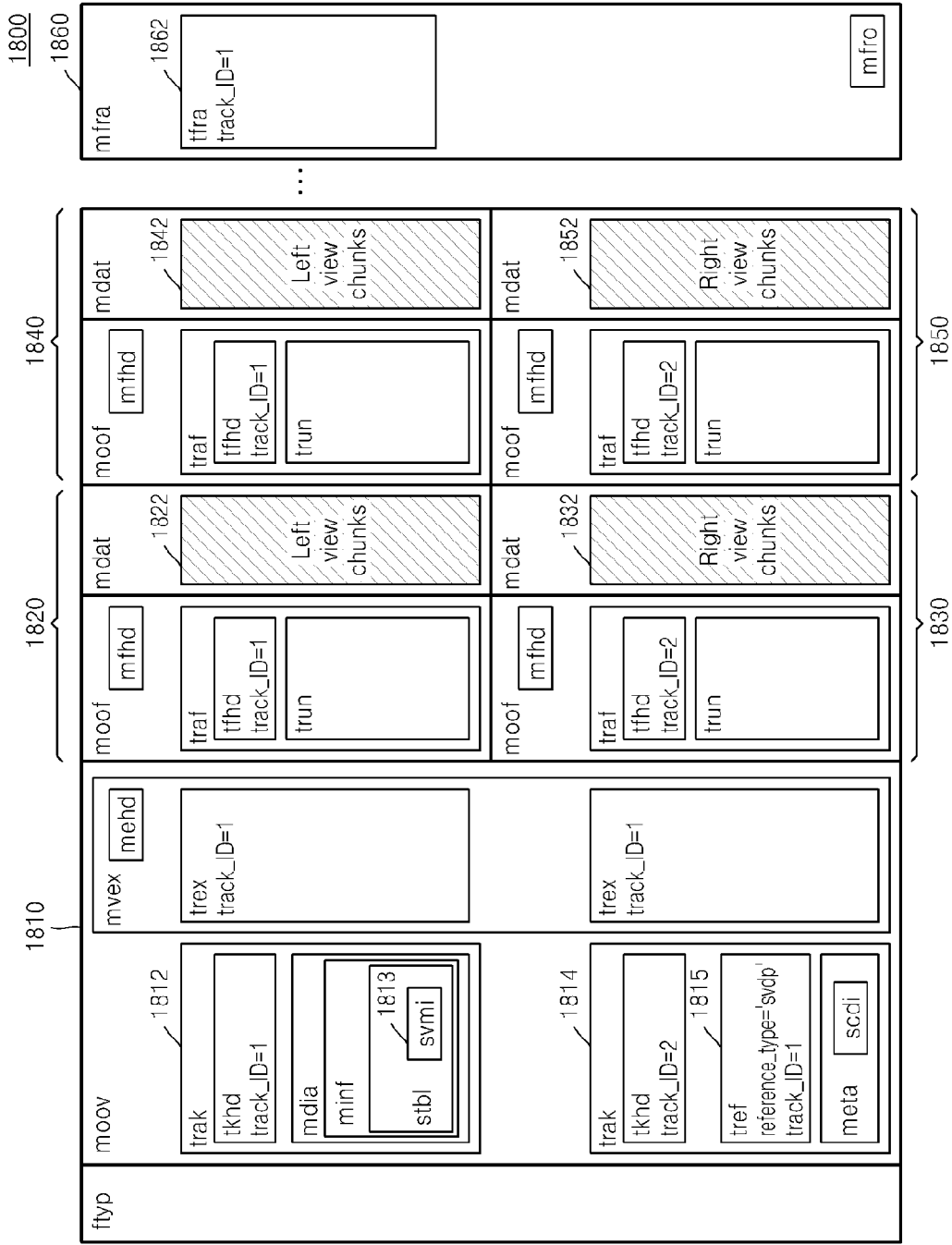

FIGS. 17 and 18 illustrate a streaming file format for transmitting a left video and a right video of a stereoscopic video according to an exemplary embodiment.

The multimedia streaming service providing apparatus 100 may transmit a left view ES and a right view ES for a stereoscopic video via a fragment-based streaming file.

The multimedia streaming service providing apparatus 100 may insert a left view ES and a right view ES into streaming files 1700 and 1800 according to the streaming file format 500 according to the current embodiment of the present invention and transmit the same.

The multimedia streaming service providing apparatus 100 according to the present exemplary embodiment may transmit relationship information about videos which are referred to in order to compose a stereoscopic video of a current file. For example, the multimedia streaming service providing apparatus 100 may insert relationship information into trak boxes 1712, 1714, 1812, and 1814 which are sub-boxes of moov boxes 1710 and 1810 and transmit the same.

The multimedia streaming service providing apparatus 100 may extract and read relationship information about the videos that are referred to in order to compose a stereoscopic video of a current file by parsing a received left video file.

The multimedia streaming service receiving apparatus 200 may detect a streaming file including another video that is referred to by using the read relationship information and combine videos that are extracted from the two streaming files to thereby restore a stereoscopic image.

First, referring to FIG. 17, each fragment of the streaming file 1700 may include a left video, which is a first track, and a right video, which is a second track. That is, a left video 1722 and a right video 1724 may be transmitted via a first fragment 1720, and a left video 1732 and a right video 1734 may be transmitted via a second fragment 1730.

For each track, the moov box 1710 includes a first trak box 1712 for a first track and a second trak box 1714 for a second track. Relationship information according to an exemplary embodiment may be inserted into a tref box 1715 of the second trak box 1714 regarding the second track, through which a right video for an additional viewpoint video of the stereoscopic video is transmitted, and be transmitted. The relationship information according to the present exemplary embodiment may include reference type information 'refernce_type' and basic viewpoint track identification information 'track_ID'.

Referring to FIG. 18, for each fragment of the streaming file 1800, a left video which is a first track and a right video which is a second track may be individually inserted. That is, a left video 1822 may be transmitted via the first fragment 1820, and a right video 1832 may be transmitted via the second fragment 1830, and a left video 1842 may be transmitted via the third fragment 1840, and a right video 1852 may be transmitted via the fourth fragment 1850.

Referring to FIG. 18, the relationship information according to the present exemplary embodiment may include offset information about a fragment including a right video which is referred to by a left video.

If offset information regarding a fragment to which a right video is transmitted is not separately transmitted as the relationship information, the first and third fragments 1820 and 1840 of the corresponding left video and the second and fourth fragments 1830 and 1850 of the right video may be preferably sequentially inserted into the streaming file 1800 and be transmitted. Accordingly, while receiving the streaming file 1800, the multimedia streaming service receiving apparatus 200 according to the present exemplary embodiment may receive the second and fourth fragments 1830 and 1850 of the corresponding right video immediately after the first and third fragments 1820 and 1840 of the left video.

For each track, the moov box 1710 includes a first trak box 1712 for a first track and a second trak box 1714 for a second track. Relationship information according to an exemplary embodiment may be inserted into a tref box 1715 of the second trak box 1714 regarding the second track, through which a right video for an additional viewpoint video of the stereoscopic video is transmitted, and be transmitted. The relationship information according to the present exemplary embodiment may include reference type information 'refernce_type' and basic viewpoint track identification information 'track_ID'.

The multimedia streaming service receiving apparatus 200 may sequentially parse the moov boxes 1710 and 1810 and the trak boxes 1712, 1714, 1812, and 1814 of the received streaming files 1700 and 1800 to read that a right video which is an additional viewpoint video is included in the second track corresponding to the second trak boxes 1714 and 1814, from which the tref boxes 1715 and 1815 are extracted. In addition, the fact that the second track is dependent on the first track is read based on the reference type information 'reference_type' and the basic viewpoint identification information 'track_ID', and thus, a left video may be extracted from the fragments of the first track corresponding to the first trak boxes 1712 and 1812, and a right video may be extracted from the fragments of the second track corresponding to the second trak boxes 1714 and 1814.

Tfra boxes 1762 and 1862 which are sub-boxes of mfra boxes 1760 and 1860 may include fragment offset information indicating a distance between a presentation time of a stereoscopic video and a fragment. As the presentation time of a left video and a right video of the stereoscopic video are identical, just by using the tfra boxes 1762 and 1862 about the first track, fragment offset information for extracting a stereoscopic video of the streaming file 1700 may be provided.

FIGS. 19 and 20 illustrate a method of determining a reference video by using an index file outside a file when transmitting a stereoscopic video to a streaming file according to an exemplary embodiment.

The multimedia streaming service providing apparatus 100 may transmit relationship information for indicating a reference video of a current video by using an external index file.

Information about a plurality of components for a single content may be transmitted together via an external index file SMIL according to an exemplary embodiment. That is, the external index file SMIL according to the present exemplary embodiment may include both index information for a left video track that is transmitted via a current file "test_1644.mp4" and index information for a right video track.

Referring to FIG. 19, an index file outside a file may include track identification information 'trackID' and stereoscopic type information 'stereotype' in order to identify a left video track and a right video track included in a current streaming file.

Referring to FIG. 20, a reference video may be searched by using an index file outside the current streaming file and a tref box inside the current streaming file. The index file outside the current streaming file may include track identification information 'trackID' and stereoscopic type information 'stereotype' in order to identify a left video track and a right video track included in the current streaming file.

Referring to FIG. 20, the multimedia streaming service receiving apparatus 200 may read that a track corresponding to a trak box including a tref box is an additional viewpoint video track of the trak boxes of the moov box of a received streaming file. Accordingly, a basic viewpoint video may be extracted from fragments of a track indicated by an index file outside the received streaming file, and an additional viewpoint video may be extracted from fragments of a track corresponding to the trak box including the tref box.

The multimedia streaming service receiving apparatus 200 may extract a basic viewpoint video that forms a stereoscopic video and an additional viewpoint video from the received streaming file, and index information about a basic viewpoint video and an additional viewpoint video of a current streaming file to thereby read a reference relationship between the basic viewpoint video and the additional viewpoint video. The multimedia streaming service receiving apparatus 200 may combine the basic viewpoint video and the additional viewpoint video extracted from the streaming file to thereby restore a stereoscopic video.

Alternatively, the multimedia streaming service receiving apparatus 200 may read a relationship between the basic viewpoint video and the additional viewpoint video of the current streaming file by using an external index file to thereby combine the basic viewpoint video and the additional viewpoint video so as to restore a stereoscopic video.

In order to present a stereoscopic video that is described above with reference to FIGS. 10 through 20 and transmitted or received via a streaming file based on fragments, a left video and a right video may be synchronized. A left video and a right video may be synchronized with each other by setting the same presentation time and the same sample duration for a left view sample and a right view sample.

Hereinafter, referring to FIGS. 21 and 22, in respect to a multi-channel video group for an adaptive streaming service, a method of using relationship information regarding video data forming a multi-channel video group according to an exemplary embodiment will be described.

To provide an adaptive streaming service of multimedia, a multi-channel video group may be provided in order to provide videos that are differentially encoded according to at least one of video quality and bitrates. Encoded video data of a selected channel of a multi-channel video group may be transmitted or received.

The multimedia streaming service receiving apparatus 200 may request a video of a predetermined channel of a multi-channel video group to the multimedia streaming service providing apparatus 100 in consideration of at least one of a network environment, a current status and capability of the multimedia streaming service receiving apparatus 200.

The multimedia streaming service providing apparatus 100 may transmit relationship information of a video forming a multi-channel video group so that the multimedia streaming service receiving apparatus 200 may select a video of a desired type from the multi-channel video group.

The multimedia streaming service receiving apparatus 200 may select, request, and receive a video of a desired channel by using the relationship information of a multi-channel video group according to an exemplary embodiment. The multimedia streaming service receiving apparatus 200 may restore a video by using the received predetermined channel.

FIG. 21 illustrates a syntax of an afgp box including relationship information of a multi-channel video group according to an exemplary embodiment to provide an adaptive streaming service.

The multimedia streaming service providing apparatus 100 may add an afgp box to the multimedia streaming file format 300 or 500 to thereby transmit relationship information regarding a multi-channel video group that is related to a video that is being transmitted via a current streaming file.

The afgp box according to the present exemplary embodiment may be composed in the same channel as the ftyp box and the moov box or the like.

The afgp box according to the present exemplary embodiment may include relationship information regarding another video that may substitute a current video, from among a multi-channel video group related to a current video. The afgp box may include number information of videos forming a multi-channel video group 'entry_count' and location information of the predetermined videos 'file_location.'

The location information of the afgp box 'file_location' may indicate a remote position and URL or the like of the videos. That is, the afgp box according to the present exemplary embodiment may transmit not only a current streaming file but location information of videos that are located in an external file.

The location information 'file_location' may be a character row that is encoded in a language such as UTH-8. The external file indicated by the location information 'file_location' and the current file may share a value of multi-channel video group name information 'alternate_group', thereby representing a substitution relationship between the current file and the external file.

For example, if 'alternate_group' of the current file including an afgp box and 'alternate_group' of a video included in a predetermined external file described by 'file_locations' of the afgp box are the same but not 0, a video of the current file and a video of the predetermined external file may be indicated as videos that may substitute each other and form a multi-channel video group.

The multimedia streaming service receiving apparatus 200 may parse the afgp box from the received streaming file to thereby read the number and location information of videos that form a multi-channel video group.

The multimedia streaming service receiving apparatus 200 may select a video of a desired channel from among videos forming a multi-channel video group that is read from the afgp box, and may request and receive a video located in a currently received file or an external file.

Figures 22, 23:
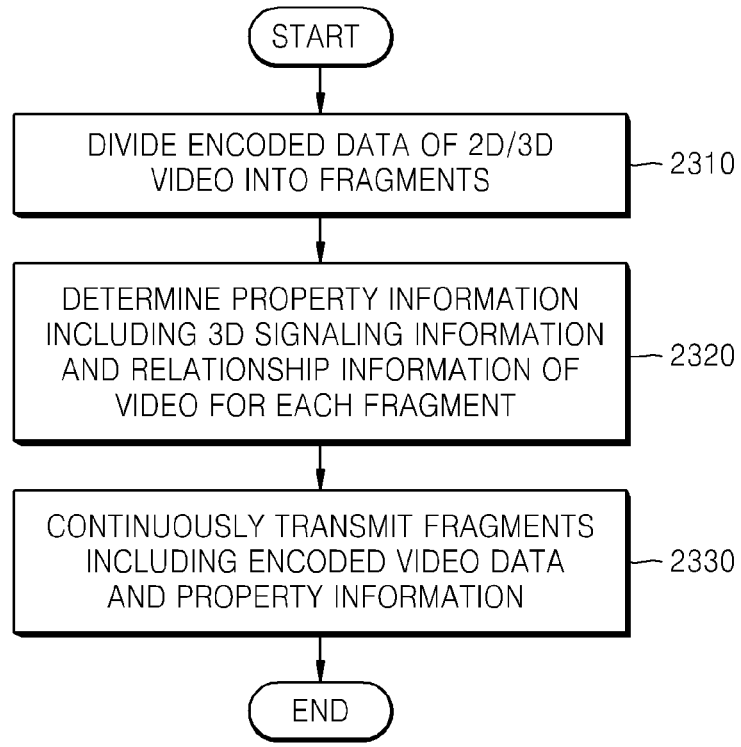
FIG. 22 illustrates an operation of setting relationship information of a multi-channel video group according to an exemplary embodiment, for an adaptive streaming service.
FIG. 23 is a flowchart illustrating a method of providing a multimedia streaming service according to an exemplary embodiment.

FIG. 22 illustrates an operation of setting relationship information of a multi-channel video group according to an exemplary embodiment in order to provide an adaptive streaming service.

The multimedia streaming service providing apparatus 100 may transmit relationship information between a plurality of videos forming a multi-channel video group by using an external index file. For example, an external index file SMIL according to an exemplary embodiment may include both index information 2210 about a first file and index information 2220 about a second file.

The external index file SMIL may include video location information (test_1644.mp4, test_3288.mp4), bitrate information (1644000 or 3288000), and group name information (alternate_group) regarding each of videos forming a multi-channel video group.

The external index file SMIL according to the present exemplary embodiment may include remote location information or URL information of a currently received file or an external file as location information about video data included in the multi-channel video group.

Also, if the first file "test_1644.mp4" is a video track inside the currently received file, the external index file SMIL according to the present exemplary embodiment may further include track identification information (trackID).

Accordingly, the multimedia streaming service receiving apparatus 200 may read location information and property information of a video of a multi-channel video group to which a current video belongs, from an external index file of the received streaming file. The multimedia streaming service receiving apparatus 200 may select a substitute video from the multi-channel video group that is read from the external index file and request and receive a video located in the currently received file or an external file.

FIG. 23 is a flowchart illustrating a method of providing a multimedia streaming service according to an exemplary embodiment.

In operation 2310, encoded data of a video including at least one of 2D video data and 3D video data is divided into fragments.

A fragment according to an exemplary embodiment may include one of a monoscopic video section, a stereoscopic video section, and a mixed video section including a monoscopic video section and a stereoscopic video section.

In operation 2320, for each fragment, property information including at least one of 3D signaling information and relationship information is determined.

For each fragment, at least one of 3D composition information, sequencing order information, and stereo mono-section change count information may be determined.

For each section of each fragment, at least one of a stereo verification information and section sample number information may be determined. For each stereoscopic video section of each fragment, 3D composition information and sequencing order information of samples may be determined.

Stereoscopic camera display information about samples for each stereoscopic video section of each fragment may be determined. The stereoscopic camera display information according to an exemplary embodiment may be represented by using an item to which stereoscopic camera display information is applied.

According to an exemplary embodiment, at least one of 3D composition information, sequencing order information, and stereo mono fragment change count information may be determined with respect to a video of a current file. In addition to the 3D composition information, sequencing order information, and stereo mono fragment change count information of a file, at least one of stereo mono-section change count information, section sample number information, and stereo verification information may be further determined for each fragment. According to an exemplary embodiment, for each stereoscopic video section of a current fragment, stereoscopic video section identification information may be determined.

As relationship information that is used when a video of a current file searches for reference videos forming a stereoscopic video, not only location information of reference videos within a current file but at least one of remote location information, and URL information and URN information of the reference videos located outside the current file may also be used.

When a video of a current file refers to a plurality of videos, number information of the reference videos, reference index information for identifying the reference videos, and location information thereof may be determined.

To provide an adaptive streaming service according to an exemplary embodiment, a multi-channel video group that provides videos of multiple channels that are differentiated according to video quality may be generated. In this case, at least one of number information of videos that form a multi-channel video group and reference information indicating locations of videos of different channels may be determined. In particular, the location information of videos forming a multi-channel video group may also indicate locations of videos existing in a file outside the current file.

In operation 2330, fragments including property information of divided videos of and encoded video data of the divided videos are continuously transmitted. The property information of the fragments may be inserted into an auxiliary data area of the fragments to be transmitted, and the encoded video data that is divided into fragments may be inserted into a media data area of the fragments to be transmitted.

Figure 24:
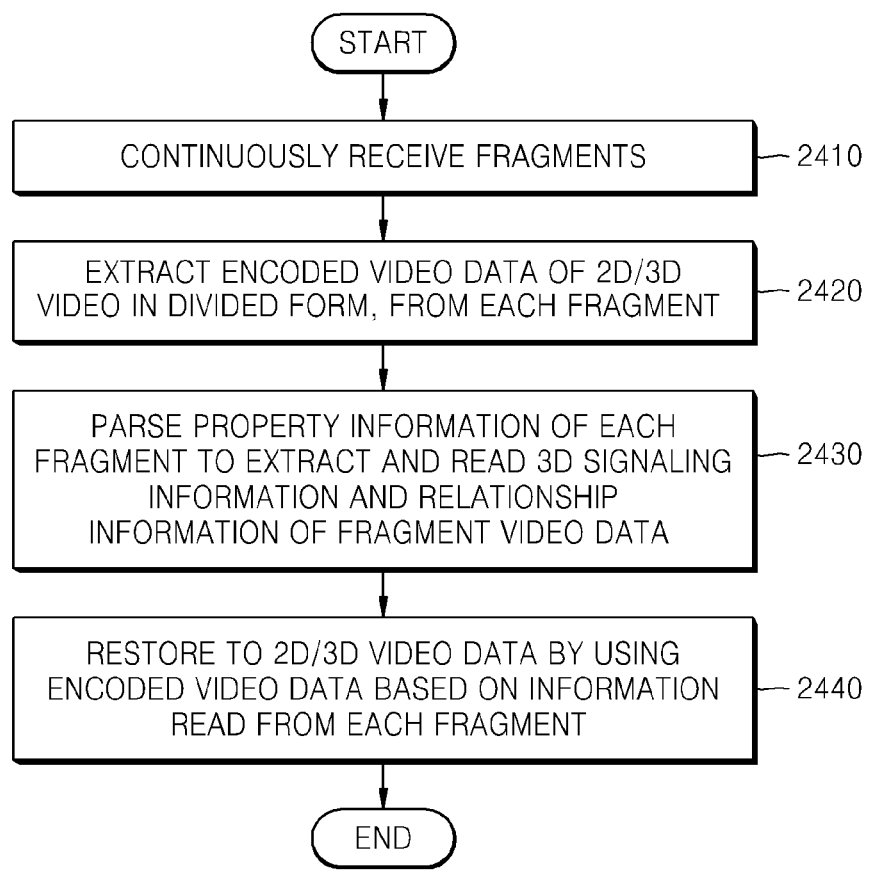
FIG. 24 is a flowchart illustrating a method of receiving a multimedia streaming service according to an exemplary embodiment.

FIG. 24 is a flowchart illustrating a method of receiving a multimedia streaming service according to an exemplary embodiment.

In operation 2410, a plurality of fragments are continuously received.

In operation 2420, encoded video data of fragments that are formed of a 2D video section or a 3D video section is extracted from a media data area of each fragment.

In operation 2430, property information is parsed from an auxiliary data area of each of the fragments, and at least one of 3D signaling information for 2D presentation or 3D presentation of fragment video data and relationship information for reference between a plurality of videos is extracted and read.

According to an exemplary embodiment, 3D composition information of the fragments may be extracted, and a form by which a left image and a right image form a stereoscopic image of a current fragment may be read. According to an exemplary embodiment, the sequencing order information of the fragments may be extracted, and a sequencing order of a pair of a left image and a right image in the stereoscopic image of a current fragment may be read.

According to an exemplary embodiment, stereo mono-section change count information of the current fragment may be extracted, and a change count of a monoscopic video section and a stereoscopic video section of the current fragment may be read.

According to an exemplary embodiment, at least one of stereo verification information and section sample number information of the current fragment may be extracted, and a monoscopic video section and a stereoscopic video section of the current fragment may be identified.

For each stereoscopic video section of a fragment according to an exemplary embodiment, at least one of 3D composition information and sequencing order information is extracted to read 3D composition information of samples forming a current stereoscopic video section, and sequencing order information may be read.

For each stereoscopic video section of a fragment according to an exemplary embodiment, stereoscopic camera display information may be extracted to thereby read information about a stereoscopic camera which has obtained samples forming a current stereoscopic video section and about display standards. The stereoscopic camera display information according to an exemplary embodiment may be read with respect to items that are to be applied.

According to an exemplary embodiment, at least one of 3D composition information, sequencing order information, and stereo mono fragment change count information may be extracted with respect to a video of a current file, and at least one of stereo mono-section change count information, section sample number information, and stereo verification information for each fragment may be further extracted and read.

According to an exemplary embodiment, for each stereoscopic video section from among at least one stereoscopic video section, identification information about each stereoscopic video section may be extracted to thereby identify a stereoscopic video section.

As at least one of location information of a reference video, identification information of a reference video, remote location information, URL information, and URN information of a reference video located outside the current file may be extracted and read to thereby search for video data of the current file and another video that is being referred to.

If a video of a current file according to an exemplary embodiment refers to a plurality of videos, at least one of the number of reference videos, reference index, and location of the reference videos may be read to thereby selectively detect a video that is being referred to.

To receive an adaptive streaming service according to an exemplary embodiment, relationship information regarding a multi-channel video group providing videos that are differentially encoded into a plurality of channels according to video quality may be received. Relationship information about a multi-channel video group may be received, and desired substitute videos may be selectively requested and received based on the relationship information and the location information of the substitute videos.

In operation 2440, based on information read from the 3D signaling information or the relationship information of each fragment, video data extracted from each fragment may be decoded and combined so as to be restored to a 2D video or a 3D video. By using the 3D signaling information or relationship information according to an exemplary embodiment, a restored video may be presented in 2D or 3D.

The multimedia streaming service providing apparatus 100 or the multimedia streaming service receiving apparatus 200 transmits or receives 3D signaling information of a stereoscopic video in units of files, fragments, or samples, via a streaming file format based on fragments according to an exemplary embodiment.

In addition, via at least one streaming file based on a fragment-based streaming file format according to an exemplary embodiment, relationship information between a plurality of videos such as a basic viewpoint video and an additional viewpoint video of a stereoscopic video and property information of the videos may be transmitted or received.

Accordingly, as files which are generated previously or existing files at different locations may be referred to, a multimedia service providing correlation or combination of a plurality of videos may be provided without the need to recreate files for transmitting reference videos or any physical restriction.

To provide an adaptive streaming service using Hypertext Transfer Protocol (HTTP), relationship information between a plurality of videos that form a stereoscopic video and 3D signaling information thereof may be provided in an integrated form that is compatible with an ISO based media file format by using a streaming file format. Not only multimedia such as videos and audios encoded in various channel qualities but also stereoscopic multimedia may be loaded in at least one multimedia file to be provided, and multimedia of variable qualities may be adaptively and constantly provided to a user according to a transmission bandwidth or performance of a terminal apparatus.

The above-described block diagrams may be construed by a person of ordinary skill in the art that it is a form conceptually expressing circuits for implementing the principles of exemplary embodiments. Similarly, it is obvious to a person of ordinary skill in the art that a flowchart, a status transition view, a pseudo-code, or the like, may be substantially expressed in a computer-readable medium to denote various processes which can be executed by a computer or a processor whether or not the computer or the processor is clarified or not. Thus, the foregoing exemplary embodiments may be created as programs which can be executed by computers and may be implemented in a general digital computer operating the programs by using a computer-readable recording medium. The computer-readable medium may include storage mediums such as a magnetic storage medium (e.g., a ROM, a floppy disk, a hard disk, or the like), an optical reading medium (e.g., a CD-ROM, a DVD, or the like).

Operations of various elements illustrated in the drawings may be provided by the use of dedicated hardware as well as by hardware which is related to appropriate software and can execute the software. When provided by a processor, such operations may be provided by a single dedicated processor, a single shared processor, or a plurality of individual processors which can share some of the operations. Also, the stated use of terms "processor" or "controller" should not be construed to exclusively designate hardware which can execute software and may tacitly include digital signal processor (DSP) hardware, a ROM for storing software, a RAM, and a non-volatile storage device, without any limitation.

In the claims, elements expressed as units for performing particular functions may cover a certain method performing a particular function, and such elements may include a combination of circuit elements performing particular functions, or software in a certain form including firmware, microcodes, or the like, combined with appropriate circuits to perform software for performing particular functions.

Designation of 'an exemplary embodiment' and various modifications of such an expression may mean that particular features, structures, characteristics, and the like, in relation to this exemplary embodiment are included in at least one exemplary embodiment. Thus, the expression 'an exemplary embodiment' and any other modifications disclosed throughout the entirety of the disclosure may not necessarily designate the same exemplary embodiment.

In the specification, in a case of 'at least one of A and B', the expression of 'at least one among ~' is used to cover only a selection of a first option (A), only a selection of a second option (B), or a selection of both options (A and B). In another example, in a case of 'at least one of A, B, and C', the expression of 'at least one among ~' is used to cover only a selection of a first option (A), only a selection of a second option (B), only a selection of a third option (C), only a selection of the first and second options (A and B), only a selection of the second and third options (B and C), or a selection of all of the three options (A, B, and C). Even when more items are enumerated, it will be obvious to a person of ordinary skill in the art that they can be definitely extendedly construed.

While exemplary embodiments have been particularly shown and described above, it will be understood by one of ordinary skill in the art that various changes in form and details may be made therein without departing from the spirit and scope of the present inventive concept as defined by the following claims. The above-described exemplary embodiments should be considered in a descriptive sense only and not for purposes of limitation. Therefore, the scope of the inventive concept is defined not by the detailed description of exemplary embodiments but by the following claims, and all differences within the scope will be construed as being included in the present inventive concept.

The invention claimed is:

1. A method of providing a multimedia streaming service via a network, the method comprising:
dividing, into fragments, encoded data of a video including at least one of a two-dimensional (2D) video and a three-dimensional (3D) video;
determining, for each of the fragments, property information including 3D signaling information, the 3D signaling information including information for 2D or 3D presentation of a current video, relationship information that is to be used by the current video to refer to at least one other video, and change count information when the respective fragment includes 2D video and 3D video that is to be used to distinguish between said 2D video and said 3D video within the respective fragment; and
continuously transmitting the fragments, wherein each of the fragments comprises an auxiliary data area including the property information of the fragments and a media data area including the encoded video data,
wherein the relationship information comprises index information and location information of a reference video.

2. The method of claim 1, wherein the determining the property information comprises:
determining, for each of the fragments, at least one of 3D composition information indicating a form by which a left image and a right image form a stereoscopic image, sequencing order information indicating a sequencing order of a pair of the left image and the right image of the stereoscopic image, and the change count information indicating a count of changes of a monoscopic video section and a stereoscopic video section; and
determining at least one of stereo verification information indicating whether a current section is the monoscopic video section or the stereoscopic video section and section sample number information indicating a number of samples forming the current section.

3. The method of claim 2, wherein the determining the property information further comprises:
determining, for each stereoscopic video section of at least one stereoscopic video section of a current fragment, at least one of the 3D composition information for samples forming a stereoscopic video section, the sequencing order information, identification information of the each stereoscopic video section of the at least one stereoscopic video section, and stereoscopic camera display information including information about a stereoscopic camera that obtains the samples of the each stereoscopic video section and information about display standards for safely presenting the 3D video in 3D by using the samples of the each stereoscopic video section,
wherein the stereoscopic camera display information comprises at least one of information indicating a number of items to which the stereoscopic camera display information is applied in the each stereoscopic video section of the current fragment, identification information of the stereoscopic camera display information that is referred to in each item, and information about a length of a section to which the stereoscopic camera display information is applied.

4. The method of claim 1, wherein the determining the property information comprises:
determining a location of a reference video that is referred to in order to form a stereoscopic video with respect to a video of a current file, by using at least one of reference video identification information in the current file, remote location information outside the current file, and uniform resource locator (URL) information and uniform resource name (URN) information of the reference video; and
determining, when the video of the current file refers to a plurality of reference videos, at least one of number information of the plurality of reference videos, reference index information for identifying the plurality of reference videos, and location information of the respective reference videos.

5. The method of claim 1, further comprising:
generating a plurality of videos of multiple channels by differentially encoding the video according to video quality,
wherein the determining the property information comprises determining at least one of multi-channel number information indicating a number of videos of another channel and reference information indicating a location of a video of the another channel.

6. A method of receiving a streaming service for receiving multimedia via a network, the method comprising:
continuously receiving fragments;
extracting, from a media data area of each of the fragments, encoded data of a video including at least one of a 2D video and a 3D video in a form divided into the fragments;
obtaining property information from an auxiliary data area of each of the fragments and extracting and reading 3D signaling information for 2D or 3D presentation of a video of the fragments, relationship information that is to be used when the video refers to at least one other video, and change count information when the respective fragment includes 2D video and 3D video that is to be used to distinguish between said 2D video and said 3D video within the respective fragment; and
restoring the encoded data of the fragments to the 2D video or the 3D video based on the at least one of the 3D signaling information, the relationship information, and the change count information read from the property information for each of the fragments,
wherein the relationship information comprises index information and location information of a reference video.

7. The method of claim 6, wherein the obtaining the property information comprises:
extracting and reading, for each of the fragments, at least one of 3D composition information indicating a form by which a left image and a right image form a stereoscopic image, sequencing order information indicating a sequencing order of a pair of the left image and the right image in the stereoscopic image, and the change count information indicating a count of changes of a monoscopic video section and a stereoscopic video section; and
extracting and reading at least one of stereo verification information indicating whether a current section is the monoscopic video section or the stereoscopic video section and section sample number information indicating a number of samples forming the current section.

8. The method of claim 7, wherein the obtaining the property information further comprises:

extracting and reading, for each stereoscopic video section in at least one stereoscopic video section of a current fragment, at least one of the 3D composition information for samples of the each stereoscopic video section, the sequencing order information, identification information of the each stereoscopic video section in the at least one stereoscopic video section, and stereoscopic camera display information including information about a stereoscopic camera that obtains the samples of the each stereoscopic video section and information about display standards for safely presenting the 3D video in 3D by using the samples of the each stereoscopic section, wherein the stereoscopic camera display information comprises at least one of information indicating a number of items to which the stereoscopic camera display information is applied in the each stereoscopic video section of the current fragment, identification information of the stereoscopic camera display information that is referred to in each item, and information about a length of a section to which the stereoscopic camera display information is applied.

9. The method of claim 6, wherein the obtaining the property information comprises:

extracting a location of a reference video that is set with respect to a video of a current file and is referred to in order to form a stereoscopic video, by using at least one of reference video identification information in the current file, remote location information outside the current file, and uniform resource locator (URL) information and uniform resource name (URN) information of the reference video; and determining, when the video of the current file refers to a plurality of reference videos, at least one of number information of the reference videos, reference index information for identifying the plurality of reference videos, and location information of the respective reference videos.

10. The method of claim 6, further comprising:

selectively receiving the video of a predetermined channel from among a plurality of videos of multiple channels that are differentially encoded according to video quality, wherein the extracting the property information comprises extracting at least one of multi-channel number information indicating a number of videos of different channels from a video of the current file and reference information indicating a location of a video of the different channels.

11. The method of claim 6, further comprising presenting the restored 2D video or 3D video based on information that is read from the 3D signaling information for each of the fragments.

12. An apparatus for providing a multimedia streaming service via a network, the apparatus comprising:

a fragment video data generator which divides, into fragments, encoded data of a video including at least one of a 2D video and a 3D video;

a fragment property information determiner which determines, for each of the fragments, property information including 3D composition information, the 3D composition information including information for 2D or 3D presentation of a current video for each fragment, relationship information for the current video to refer to at least one other video, change count information when the respective fragment includes 2D video and 3D video that is to be used to distinguish between said 2D video and said 3D video within the respective fragment; and a streamer which continuously transmits the fragments, wherein each of the fragments comprises an auxiliary data area including the property information of the fragments and a media data area including the encoded video data, wherein the relationship information comprises index information and location information of a reference video.

13. An apparatus for receiving a streaming service for receiving multimedia via a network, the apparatus comprising:

a receiver which continuously receives fragments;

a fragment video data extractor which extracts, from a media data area of each of the fragments, encoded data of a video including at least one of a 2D video and a 3D video, the encoded data of the video being in a form divided into the fragments;

a fragment property information extractor which obtains property information from an auxiliary data area of each of the fragments, and extracts and reads 3D signaling information for 2D or 3D presentation of the video of the fragments, relationship information that is to be used when the video refers to at least one other video, and change count information when the respective fragment includes 2D video and 3D video that is to be used to distinguish between said 2D video and said 3D video within the respective fragment; and a restorer which restores the encoded data of the fragments to the 2D video or the 3D video based on the at least one of the 3D signaling information and the relationship information read from the property information of each of the fragments, wherein the relationship information comprises index information and location information of a reference video.

14. A non-transitory computer readable recording medium having embodied thereon a computer processor for executing the method of providing a multimedia streaming service of claim 1.

15. A non-transitory computer readable recording medium having embodied thereon a computer processor for executing the method of receiving a multimedia streaming service of claim 6.

16. The apparatus of claim 12, wherein:

the fragment property information determiner determines, for each of the fragments, at least one of 3D composition information indicating a form by which a left image and a right image form a stereoscopic image, sequencing order information indicating a sequencing order of a pair of the left image and the right image of the stereoscopic image, and the change count information indicating a count of changes of a mono scopic video section and a stereoscopic video section; and the fragment property information determiner determines at least one of stereo verification information indicating whether a current section is the monoscopic video section or the stereoscopic video section and section sample number information indicating a number of samples forming the current section.

17. The apparatus of claim 13, wherein:

the fragment property information extractor extracts and reads, for each of the fragments, at least one of 3D composition information indicating a form by which a left image and a right image form a stereoscopic image, sequencing order information indicating a sequencing order of a pair of the left image and the right image in the stereoscopic image, and the change count information indicating a count of changes of a mono scopic video section and a stereoscopic video section; and the fragment property information extractor extracts and reads at least one of stereo verification information indicating whether a current section is the monoscopic video section or the stereoscopic video section and section sample number information indicating a number of samples forming the current section.

18. The apparatus of claim 17, wherein:

the fragment property information extractor extracts and reads, for each stereoscopic video section in at least one stereoscopic video section of a current fragment, at least one of the 3D composition information for samples of the each stereoscopic video section, the sequencing order information, identification information of the each stereoscopic video section in the at least one stereoscopic video section, and stereoscopic camera display information including information about a stereoscopic camera that obtains the samples of the each stereoscopic video section and information about display standards for safely presenting the 3D video in 3D by using the samples of the each stereoscopic section; and the stereoscopic camera display information comprises at least one of information indicating a number of items to which the stereoscopic camera display information is applied in the each stereoscopic video section of the current fragment, identification information of the stereoscopic camera display information that is referred to in each item, and information about a length of a section to which the stereoscopic camera display information is applied.

19. The apparatus of claim 13, wherein:

the fragment property information extractor extracts a location of a reference video that is set with respect to a video of a current file and is referred to in order to form a stereoscopic video, by using at least one of reference video identification information in the current file, remote location information outside the current file, and uniform resource locator (URL) information and uniform resource name (URN) information of the reference video; and the fragment property information extractor determines, when the video of the current file refers to a plurality of reference videos, at least one of number information of the reference videos, reference index information for identifying the plurality of reference videos, and location information of the respective reference videos.

20. The apparatus of claim 13, further comprising a presenter which presents the restored 2D video or 3D video based on information that is read from the 3D signaling information for each of the fragments.

* * * * *